(12) United States Patent
Suzuki et al.

(10) Patent No.: US 12,474,992 B2
(45) Date of Patent: Nov. 18, 2025

(54) INFORMATION PROCESSING APPARATUS THAT SYNCHRONIZES A STANDBY SYSTEM DATABASE WITH AN ACTIVE SYSTEM DATBASE

(71) Applicant: NTT DOCOMO, INC., Chiyoda-ku (JP)

(72) Inventors: Akihiro Suzuki, Chiyoda-ku (JP); Masaki Machimoto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 47 days.

(21) Appl. No.: 18/553,876

(22) PCT Filed: Mar. 11, 2022

(86) PCT No.: PCT/JP2022/010855
§ 371 (c)(1),
(2) Date: Oct. 4, 2023

(87) PCT Pub. No.: WO2022/224617
PCT Pub. Date: Oct. 27, 2022

(65) Prior Publication Data
US 2024/0193036 A1    Jun. 13, 2024

(30) Foreign Application Priority Data
Apr. 19, 2021  (JP) ................. 2021-070205

(51) Int. Cl.
G06F 11/20   (2006.01)
G06F 11/08   (2006.01)
(Continued)

(52) U.S. Cl.
CPC ............ G06F 11/08 (2013.01); G06F 16/217 (2019.01); G06F 11/1448 (2013.01);
(Continued)

(58) Field of Classification Search
CPC .......... G06F 11/07; G06F 11/08; G06F 11/20; G06F 16/178; G06F 16/217; G06F 16/28;
(Continued)

(56) References Cited

U.S. PATENT DOCUMENTS 7,529,834 B1 * 5/2009 Birrell ................. G06F 11/1464
709/227
2006/0224639 A1 * 10/2006 Watanabe ........... G06F 11/2097
(Continued)

FOREIGN PATENT DOCUMENTS

JP      2005-293315 A     10/2005

*Primary Examiner* — Joseph O Schell
(74) *Attorney, Agent, or Firm* — Oblon, McClelland, Maier & Neustadt, L.L.P.

(57) ABSTRACT

The management server includes an active process executor that updates a database of a first system on the basis of instruction information and accumulates the instruction information in a storage device of the first system as first update information, and a standby process executor that updates a database on the basis of second update information acquired from a storage device of a second system. In a case in which the active period starts in the first system before the standby process executor acquires the second update information from the storage device of the second system, the active process executor determines, upon recovery of the second system, whether to execute the recovery processing reflecting the content of the second update information in the database on the basis of the first update information and the second update information.

10 Claims, 11 Drawing Sheets

(51) Int. Cl.
*G06F 16/21* (2019.01)
*G06F 11/14* (2006.01)
*G06F 16/178* (2019.01)

(52) U.S. Cl.
CPC ...... *G06F 11/1469* (2013.01); *G06F 11/2094* (2013.01); *G06F 16/178* (2019.01)

(58) Field of Classification Search
CPC ............. G06F 11/1448; G06F 11/1469; G06F 11/2094
See application file for complete search history.

(56) References Cited

U.S. PATENT DOCUMENTS

| | | | |
|---|---|---|---|
| 2007/0203958 A1* | 8/2007 | Suzuki | G06F 11/2097 714/E11.073 |
| 2017/0111468 A1* | 4/2017 | Ash | G06F 3/0617 |
| 2017/0364427 A1* | 12/2017 | Blea | G06F 11/3055 |
| 2019/0138402 A1* | 5/2019 | Bikumala | G06F 11/2056 |

\* cited by examiner

FIG. 5

| | KEY INFORMATION | | | TELEPHONE COMMUNICATION PROCESSING INFORMATION | | | RECEPTION DATE AND TIME |
|---|---|---|---|---|---|---|---|
| NAME | TELEPHONE NUMBER | COMPANY | BASE | EXTENSION NUMBER | TRANSFER SETTING | TRANSFER DESTINATION | |
| R1 | AA BB | 090-pppp-qqqq | COMPANY A | BASE A | 1234 | YES | 050-rrrr-ssss | 2021/01/05 12:34:50 |
| R2 | CC DD | 090-tttt-uuuu | COMPANY A | BASE A | 1235 | NO | 050-vvvv-xxxx | 2021/01/05 12:34:50 |
| R3 | EE FF | 090-xxxx-yyyy | COMPANY A | BASE B | 2345 | YES | 050-zzzz-aaaa | 2021/03/04 15:14:21 |
| R4 | GG HH | 090-bbbb-cccc | COMPANY A | BASE A | 1237 | YES | 050-dddd-eeee | 2021/01/05 12:34:50 |
| R5 | KK JJ | 090-ffff-gggg | COMPANY A | BASE C | 3456 | YES | 050-hhhh-iiii | 2021/02/01 10:13:45 |
| R6 | LL MM | 090-jjjj-kkkk | COMPANY A | BASE C | 3457 | YES | 050-llll-mmm | 2021/02/01 10:13:45 |
| | ... | ... | ... | ... | ... | ... | ... | ... |

UINF

| | KEY INFORMATION | | | TELEPHONE COMMUNICATION PROCESSING INFORMATION | | | RECEPTION DATE AND TIME |
|---|---|---|---|---|---|---|---|
| NAME | TELEPHONE NUMBER | COMPANY | BASE | EXTENSION NUMBER | TRANSFER SETTING | TRANSFER DESTINATION | |
| CC DD | 090-tttt-uuuu | COMPANY A | BASE A | 1235 | YES | 050-vvvv-xxxx | 2021/03/23 13:06:00 |
| GG HH | 090-bbbb-cccc | COMPANY A | BASE A | 1237 | YES | - | 2021/03/23 13:07:59 |

R2 → (row 1)
R4 → (row 2)

FIG. 12

UINFa

| | KEY INFORMATION | | TELEPHONE COMMUNICATION PROCESSING INFORMATION | | | REFLECTION DETERMINATION | |
|---|---|---|---|---|---|---|---|
| NAME | TELEPHONE NUMBER | ... | EXTENSION NUMBER | TRANSFER SETTING | TRANSFER DESTINATION | RECEPTION DATE AND TIME | RECOVERY FLAG |
| CC DD | 090-tttt-uuuu | ... | 1235 | YES | 050-vvvv-xxxx | 2021/03/23 13:06:00 | ○ |
| GG HH | 090-bbbb-cccc | ... | 1237 | YES | - | 2021/03/23 13:07:59 | ○ |
| EE FF | 090-xxxx-yyyy | ... | 2345 | YES | - | 2021/03/23 13:09:40 | × |

R2 → (row 1)
R4 → (row 2)
R3 → (row 3)

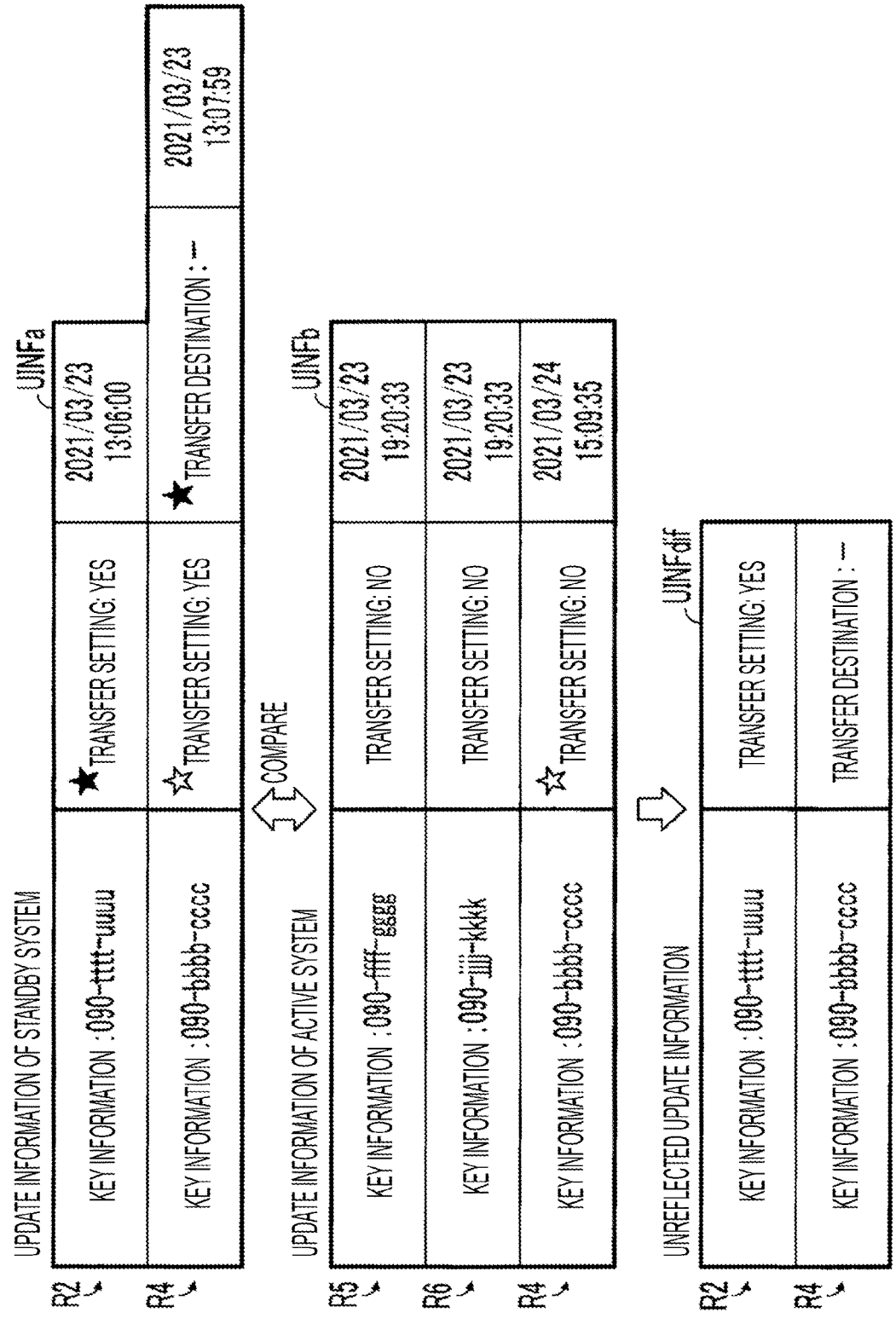

INFORMATION PROCESSING APPARATUS THAT SYNCHRONIZES A STANDBY SYSTEM DATABASE WITH AN ACTIVE SYSTEM DATBASE

TECHNICAL FIELD

The present invention relates to an information processing apparatus.

BACKGROUND ART

A system with redundancy is known having multiple systems in order to continue providing a service even in a case of a failure or the like in a system that provides the service. In such a redundant system, for example, when an active system fails, the active system is switched to a standby system. Therefore, in a case in which each of the active system and the standby system has a database, a synchronization process of synchronizing the database of the standby system with the database of the active system is performed.

For example, a system has been proposed that executes such a synchronization process using a shared memory provided in each of the active system and the standby system (for example, Patent Document 1). In this system, for example, when the active system database is updated, the changed data is written to the shared memory of the active system. Then, the data written in the shared memory of the active system is transferred to the shared memory of the standby system and is reflected in the database of the standby system.

RELATED ART DOCUMENT

Patent Document

Patent Document 1: Japanese Patent Application Laid-Open Publication No. 2005-293315

SUMMARY OF THE INVENTION

Problem to be Solved by the Invention

An active system may fail during a period in which the standby system database has not been synchronized with the active system database. In this case also, it is necessary to resynchronize the database of the standby system (the previously active system) with the database of the active system after the failed system (the previously active system) is recovered. For example, a method may be contemplated of writing all the data stored in the database of the active system to the database of the standby system (the previously active system) before the synchronous processing using the shared memory is executed after the system of the standby system (the previously active system) is restored. However, in the method of writing all the data stored in the active system database to the standby system database, there may be an increase in the processing load of the resynchronization performed after the failed system (the previously active system) has been recovered.

Means of Solving the Problem

In order to solve the above problem, an information processing apparatus according to a preferred aspect of the present invention is an information processing apparatus included in a first system of a redundant system in which one of the first system and a second system operates as an active system, whereas the other operates as a standby system, the information processing apparatus including: an active process executor configured to, in response to a reception of instruction information for updating storage content of a first database included in the first system, update the storage content of the first database on the basis of the instruction information and accumulate the instruction information in a first memory included in the first system as first update information during a first period in which the first system operates as the active system; and a standby process executor configured to, in a case in which second update information used for an update of storage content of a second database included in the second system has been accumulated in a second memory included in the second system, acquire the second update information from the second memory and update storage content of the first database on the basis of the second update information during a second period in which the first system operates as the standby system. In a case in which, due to an event of an error in the second system operating as the active system, the first period starts in the first system before the standby process executor acquires the second update information accumulated in the second memory, the active process executor is configured to determine, upon recovery of the second system, whether to execute recovery processing reflecting content of the second update information in the first database on a basis of the first update information and the second update information.

Effect of the Invention

According to the present invention, it is possible to synchronize the standby system database with the active system database while reducing or preventing an increase in the processing load of the resynchronization performed after the system in which an error such as a failure occurs has been recovered.

BRIEF DESCRIPTION OF THE DRAWINGS

FIG. 5 is an explanatory diagram illustrating an example of a database illustrated in FIG. 1.

FIG. 6 is an explanatory diagram illustrating an example of update information illustrated in FIG. 1.

FIG. 12 is an explanatory diagram for explaining an example of operations of a redundant system using a management server according to a second modification.

FIG. 13 is an explanatory diagram for explaining determination processing in a redundant system using a management server according to a third modification.

MODES FOR CARRYING OUT THE INVENTION

1. Embodiment

Figure 1:
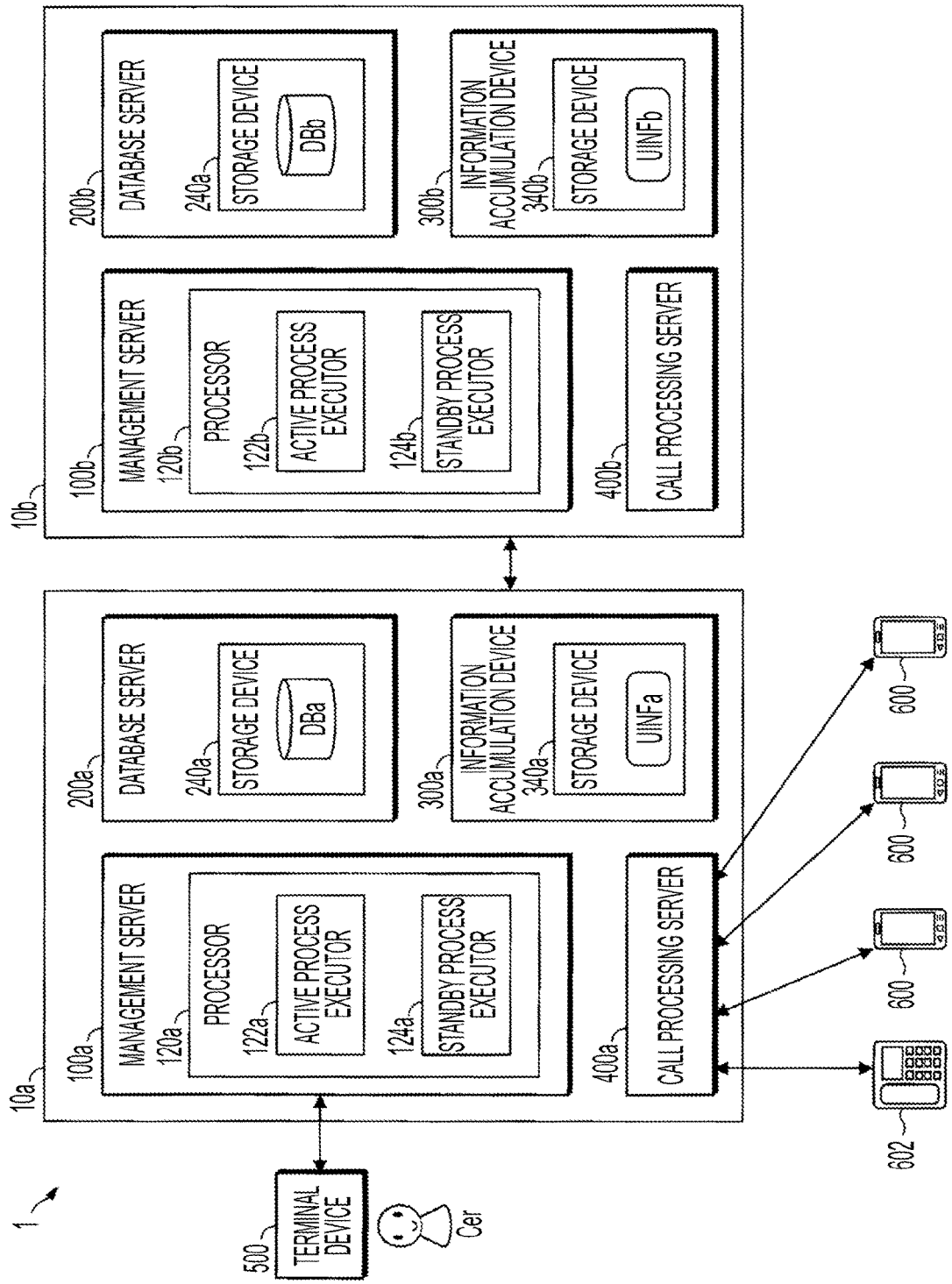
FIG. 1 is a block diagram illustrating an overall configuration of a redundant system using a management server according to an embodiment.

FIG. 1 is a block diagram illustrating an overall configuration of a redundant system 1 using a management server 100 according to an embodiment. The redundant system 1 includes, for example, two systems 10 that are redundant. For example, the configurations of the two systems 10 are substantially the same. It is to be noted that, in FIG. 1, in order to distinguish the two systems 10 from each other, a lower case letter (a or b) has been added to the end of the reference sign of the system 10. The same lower case letter (a or b) as that of the corresponding system 10 has been added to the end of the reference sign of each (for example, the management server 100 or the like) of a plurality of elements included in the system 10.

In the redundant system 1, for example, when one of the systems 10a and 10b operates as the active system, the other operates as the standby system. In FIG. 1, it is assumed that the system 10a operates as the active system and the system 10b operates as the standby system. One of the systems 10a and 10b is an example of a "first system", and the other of the systems 10a and 10b is an example of a "second system". In the present embodiment, it is assumed that the system 10 provides an extension service that causes an external line telephone terminal 600 such as a mobile phone to function also as an extension telephone terminal. The extension telephone terminal is, for example, a telephone terminal corresponding to an extension call in a predetermined base.

For example, each of the two systems 10 (10a and 10b) includes a management server 100 (100a or 100b), a database server 200 (200a or 200b), and an information accumulation device 300 (300a or 300b). Furthermore, each of the two systems 10 (10a and 10b) includes a call processing server 400 (400a or 400b) that executes connection processing or the like of an extension call.

Figure 2:
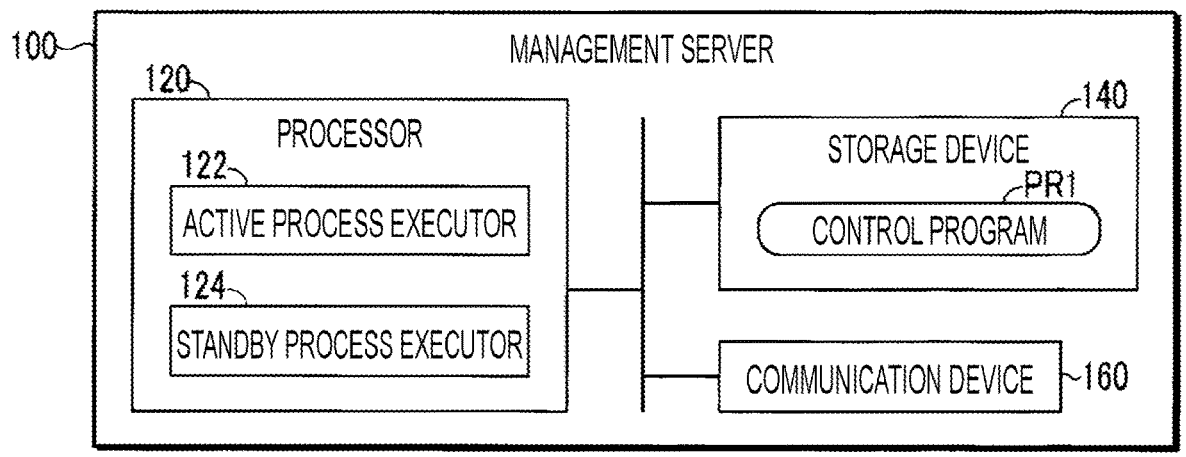
FIG. 2 is a block diagram illustrating a configuration of the management server illustrated in FIG. 1.
Figure 3:
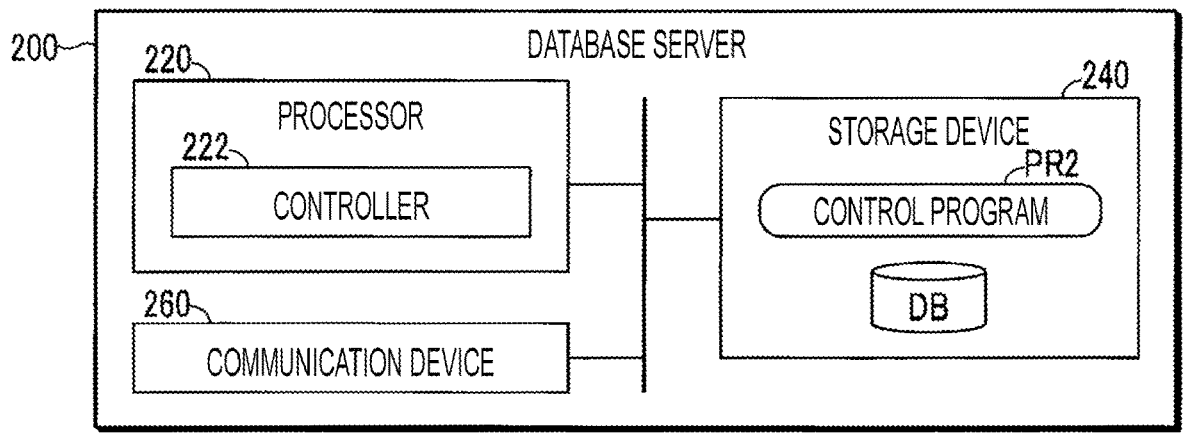
FIG. 3 is a block diagram illustrating a configuration of a database server illustrated in FIG. 1.
Figure 4:
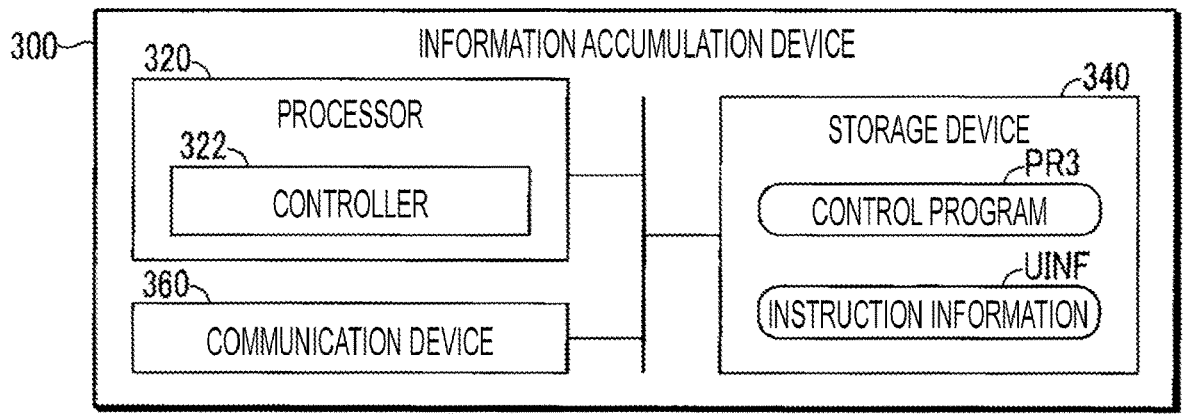
FIG. 4 is a block diagram illustrating a configuration of an information accumulation device illustrated in FIG. 1.

In FIG. 1, an outline of the management server 100, the database server 200, and the information accumulation device 300 will be described. In FIGS. 2, 3, and 4, described later, an example of a detailed configuration of the management server 100, the database server 200, and the information accumulation device 300 will be described. Furthermore, an example of detailed operations of the management server 100, the database server 200, and the information accumulation device 300 will be described later with reference to FIGS. 7, 8, and 9.

For example, each of the management servers 100 (100a or 100b) includes a processor 120 (120a or 120b) that functions as an active process executor 122 (122a or 122b) and a standby process executor 124 (124a or 124b). Each database server 200 (200a or 200b) includes a storage device 240 (240a or 240b) in which a database DB (DBa or DBb) is stored. Each of the information accumulation devices 300 (300a or 300b) includes a storage device 340 (340a or 340b) in which update information UINF (UINFa or UINFb) is stored.

The database DB of the system 10 operating as the active system is referred to, for example, by the call processing server 400 of the system 10 operating as the active system. For example, on the basis of the information indicating the extension number and the like stored in the database DB, the call processing server 400 executes connection processing of an extension call between a plurality of telephone terminals including the fixed telephone terminal 602 compatible with the extension call and the external call and the external line telephone terminal 600. An example of the information stored in the database DB, that is, the storage content of the database DB will be described with reference to FIG. 5. Since there is a possibility that the information stored in the database DB will be changed as required by the administrator Cer of the database DB, the information is updated by the active process executor 122, which will be described later. The administrator Cer may be at an operator extension service or may be at a corporation that uses an extension service.

The active process executor 122a operates, for example, in a period (hereinafter, it is also referred to as an active period of the system 10a) in which the system 10a operates as the active system, and receives instruction information CINF (CINF1, CINF2, CINF3, and the like) illustrated in FIGS. 7 and 8 that will be described later. The instruction information CINF is information for updating the storage content of the database DB included in the system 10 operating as the active system. For example, a terminal device 500 is communicably connected to the management server 100 and receives an operation by the administrator Cer of the database DB as an operation for generating the instruction information CINF, and transmits to the management server 100 the instruction information CINF generated on the basis of the received operation.

For example, the active process executor 122a receives the instruction information CINF for updating the storage content of the database DBa during the active period of the system 10a. Then, in response to a reception of the instruction information CINF, the active process executor 122a updates the storage content of the database DBa on the basis of the instruction information CINF, and accumulates the instruction information CINF in the storage device 340a as the update information UINFa.

It is to be noted that the active process executor 122b operates, for example, in a period (hereinafter, it is also referred to as an active period of the system 10b) in which the system 10b operates as the active system. The operations of the active process executor 122b in the active period of the system 10b are substantially the same as the operations of the active process executor 122a in the active period of the system 10a. For example, in response to a reception of the instruction information CINF during the active period of the system 10b, the active process executor 122b updates the storage content of the database DBb on the basis of the instruction information CINF, and accumulates the instruction information CINF in the storage device 340b as the update information UINFb.

The standby process executor 124a operates, for example, in a period (hereinafter also referred to as a standby period of the system 10a) in which the system 10a operates as the standby system, and synchronizes the database DBa with the database DBb. It is to be noted that synchronizing the database DBa with the database DBb means, for example, matching the storage content of the database DBa with the storage content of the database DBb.

For example, in a case in which the update information UINFb used for updating the storage content of the database DBb up to the current time point is accumulated in the storage device 340b, the standby process executor 124a acquires the update information UINFb from the storage device 340b during the standby period of the system 10a. Then, the standby process executor 124a updates the storage content of the database DBa on the basis of the update information UINFb acquired from the storage device 340b.

It is to be noted that the standby process executor 124b operates, for example, during a period in which the system 10b operates as the standby system (hereinafter also referred to as a standby period of the system 10b). The operations of the standby process executor 124b in the standby period of the system 10b are substantially the same as the operations of the standby process executor 124a in the standby period of the system 10a. For example, the standby process executor 124b updates the storage content of the database DBb on the basis of the update information UINFa acquired from the storage device 340a during the standby period of the system 10b.

In a case in which the system 10a corresponds to the "first system", the active period of the system 10a corresponds to the "first period", and the standby period of the system 10a corresponds to the "second period". In addition, in a case in which the system 10b corresponds to the "first system", the active period of the system 10b corresponds to the "first period", and the standby period of the system 10b corresponds to the "second period".

Here, for example, when an error occurs in the system 10b operating as the active system, the active period of the system 10a may be started before the standby process executor 124a acquires the update information UINFb accumulated in the storage device 340b. In this case, in order to synchronize the database DBb of the system 10b recovered from the error and the database DBa of the system 10a with each other, recovery processing for the database DBa may be necessary. The recovery processing for the database DBa is, for example, processing of reflecting the content of the update information UINFb accumulated in the storage device 340b of the standby system in the database DBa.

For example, the active process executor 122a determines whether to execute recovery processing reflecting the content of the update information UINFb in the database DBa on the basis of the update information UINFa and UINFb when the system 10b is recovered. In a case in which the active process executor 122a has determined to execute the recovery processing, the active process executor 122a reflects the content of the update information UINFb accumulated in the storage device 340b in the database DBa. As a result, the databases DBa and DBb can be synchronized with each other. It is to be noted that the recovery processing and a method of determining whether to execute the recovery processing will be described later with reference to FIGS. 9 and 10.

For example, in a case in which the active period of the system 10b is started due to the occurrence of an error in the system 10a operating as the active system, the active process executor 122b executes the same operation as the operation of the active process executor 122a described above.

As described above, in the present embodiment, even in a case in which an error occurs in the system 10, the databases DBa and DBb can be synchronized with each other.

It is to be noted that one of the management servers 100a and 100b is an example of an "information processing apparatus". Furthermore, one of the databases DBa and DBb is an example of a "first database", and the other of the databases DBa and DBb is an example of a "second database". One of the storage devices 340a and 340b is an example of a "first memory", and the other of the storage devices 340a and 340b is an example of a "second memory". Furthermore, one of the update information UINFa and UINFb is an example of "first update information", and the other of the update information UINFa and UINFb is an example of "second update information". For example, in a case in which the system 10a corresponds to the "first system", the management server 100a corresponds to the "information processing apparatus", and the database DBa corresponds to the "first database". Furthermore, in a case in which the system 10a corresponds to the "first system", the storage device 340a corresponds to the "first memory", and the update information UINFa corresponds to the "first update information".

The term "apparatus" in the present specification may be replaced with another term such as a circuit, a device, or a unit. Furthermore, the connection and the like between the management server 100 and the database server 200 may be, for example, a connection that enables communication between a plurality of elements, and may be a connection using one of wired and wireless, or may be a connection using both wired and wireless. For example, the terminal device 500 may be connected to the management server 100 via the Internet, which is not illustrated.

FIG. 2 is a block diagram illustrating a configuration of the management server 100 illustrated in FIG. 1. The configurations of the management servers 100a and 100b are substantially the same. Therefore, the management server 100 illustrated in FIG. 2 corresponds to each of the management servers 100a and 100b.

For example, any desired information processing apparatus can be adopted as the management server 100. For example, the management server 100 is implemented by a computer system including a processor 120, a storage device 140, and a communication device 160. Multiple elements of the management server 100 are mutually connected by a single bus or by multiple buses for communicating information. Each of the plurality of elements of the management server 100 may be configured by a single device or by multiple devices. Alternatively, some elements of the management server 100 may be omitted.

The processor 120 controls the entire management server 100, and includes, for example, one or more chips. The processor 120 includes, for example, a central processing unit (CPU) including an interface with a peripheral device, an arithmetic device, a register, and the like. Some or all of the functions of the processor 120 may be implemented by hardware such as a digital signal processor (DSP), an application specific integrated circuit (ASIC), a programmable logic device (PLD), and a field programmable gate array (FPGA). The processor 120 executes various types of processing in parallel or sequentially.

The processor 120 functions as the active process executor 122 and the standby process executor 124 described above with reference to FIG. 1, for example, by reading the application program PR1 from the storage device 140 and executing the read application program PR1. The application program PR1 may be transmitted from another device.

The storage device 140 is a recording medium readable by the processor 120, and stores various data such as a plurality of programs including the application program PR1 executed by the processor 120. The storage device 140 may include, for example, at least one of a read only memory (ROM), an erasable programmable ROM (EPROM), an electrically erasable programmable ROM (EEPROM), a random access memory (RAM), and the like. The storage device 140 may be referred to as a register, a cache, a main memory (main storage device), or the like.

The communication device 160 is hardware (a transceiver device) for communicating with other devices such as the database server 200, the information accumulation device 300, and the terminal device 500. The communication device 160 is also called, for example, a network device, a network controller, a network card, a communication module, and the like. For example, the communication device 160 may include a high-frequency switch, a duplexer, a filter, a frequency synthesizer, and the like in order to realize one or both of frequency division duplex (FDD) and time division duplex (TDD).

FIG. 3 is a block diagram illustrating a configuration of a database server 200 illustrated in FIG. 1. The configurations of the database servers 200a and 200b are substantially the same. Therefore, the database server 200 illustrated in FIG. 3 corresponds to each of the database servers 200a and 200b.

For example, any desired information processing apparatus can be adopted as the database server 200. For example, the database server 200 is implemented by a computer system including a processor 220, a storage device 240, and a communication device 260.

The processor 220 controls the entire database server 200 and is configured similarly to the processor 120 of the management server 100 described in FIG. 2. For example, the processor 220 functions as a controller 222 or the like that manages the database DB by reading a control program PR2 from the storage device 240 and executing the read control program PR2. For example, the controller 222 executes creation, update, reading, and the like of the database DB on the basis of information (for example, the instruction information CINF or the like) received from the terminal device 500 via the management server 100. In addition, the controller 222 transmits the storage content of the database DB to the call processing server 400 on the basis of, for example, a read request of the database DB from the call processing server 400. The control program PR2 may be transmitted from another device.

The storage device 240 is a recording medium readable by the processor 220, and stores a plurality of programs including the control program PR2 executed by the processor 220 and various data such as the database DB. Similarly to the storage device 140 of the management server 100 described in FIG. 2, the storage device 240 may include at least one of a ROM, an EPROM, an EEPROM, a RAM, and the like, for example.

The communication device 260 is hardware (a transceiver device) for communicating with other devices such as the management server 100, the information accumulation device 300, and the call processing server 400, and is configured similarly to the communication device 160 of the management server 100 described in FIG. 2.

FIG. 4 is a block diagram illustrating a configuration of an information accumulation device 300 illustrated in FIG. 1. The configurations of information accumulation devices 300a and 300b are substantially the same. Therefore, the information accumulation device 300 illustrated in FIG. 4 corresponds to each of the information accumulation devices 300a and 300b.

For example, any desired information processing apparatus can be adopted as the information accumulation device 300. For example, the information accumulation device 300 is implemented by a computer system including a processor 320, a storage device 340, and a communication device 360.

The processor 320 controls the entire information accumulation device 300, and is configured similarly to the processor 120 of the management server 100 described in FIG. 2. For example, the processor 320 functions as a controller 322 or the like that manages the update information UINF by reading a control program PR3 from the storage device 340 and executing the read control program PR3. For example, the controller 322 executes writing, reading, deleting, and the like of the update information UINF on the basis of information received from the management servers 100a and 100b and the like. The control program PR3 may be transmitted from another device.

The storage device 340 is a recording medium readable by the processor 320, and stores a plurality of programs including the control program PR3 executed by the processor 320 and various data such as the update information UINF. Similarly to the storage device 140 of the management server 100 described in FIG. 2, the storage device 340 may include at least one of a ROM, an EPROM, an EEPROM, a RAM, and the like, for example.

The communication device 360 is hardware (a transceiver device) for communicating with other devices such as the management server 100, and is configured similarly to the communication device 160 of the management server 100 shown in FIG. 2.

Although the configuration of the call processing server 400 is not illustrated in particular detail in FIGS. 1 to 4 described above, for example, any desired information processing apparatus can be adopted as the call processing server 400. For example, the configuration of the call processing server 400 may be substantially the same as the configuration of the management server 100 illustrated in FIG. 2. That is, the call processing server 400 may be implemented by a computer system including a processor that controls the entire call processing server 400, a storage device that stores various data, and a communication device for performing communication with another device.

Furthermore, although the configuration of the terminal device 500 is not illustrated in particular detail in FIGS. 1 to 4 described above, any desired information processing apparatus can be adopted as the terminal device 500, for example. For example, the terminal device 500 may be a stationary information apparatus such as a personal computer, or it may be a portable information terminal such as a smartphone, a notebook computer, a wearable terminal, or a tablet terminal.

The terminal device 500 may be implemented by, for example, a computer system including a processor that controls the entire terminal device 500, a storage device that stores various data, a communication device for performing communication with another device, an input device, and an output device. The input device receives an input from the outside and is, for example, a keyboard, a mouse, a microphone, a switch, a button, a sensor, and the like. The output device is an output device such as a display that performs output to the outside. The output device displays an image under control of the processor, for example. It is to be noted that the input device and the output device may be integrated (for example, a touch panel).

It is to be noted that the configuration of the redundant system 1 is not limited to the examples illustrated in FIGS. 1 to 4. For example, the management server 100 may include an auxiliary storage device. The auxiliary storage device is a recording medium that can be read by the management server 100, and may include, for example, at least one of an optical disk such as a compact disc ROM (CD-ROM), a hard disk drive, a flexible disk, a magneto-optical disk (for example, a compact disc, a digital versatile disc, and a Blu-ray (registered trademark) disc), a smart card, a flash memory (for example, a card, a stick, and a key drive), a floppy (registered trademark) disk, a magnetic strip, and the like. Similarly, for example, the database server 200, the information accumulation device 300, the call processing server 400, and the terminal device 500 may include the auxiliary storage device. The management server 100, the database server 200, the information accumulation device 300, and the call processing server 400 may include, for example, an input device and an output device.

FIG. 5 is an explanatory diagram illustrating an example of a database DB illustrated in FIG. 1.

For example, the database DB has a plurality of records R (R1, R2, R3, R4, R5, R6, and the like) in which a plurality of pieces of registration information is stored. The plurality of pieces of registration information stored in each record R has a one-to-one correspondence with the plurality of registration items, and indicates content related to the corresponding registration item. For example, a name, a telephone number, a company, a base, an extension number, a transfer setting, a transfer destination, a reception date and time, and the like correspond to a plurality of registration items. The name, the telephone number, the company, and the base correspond to, for example, key information used to specify predetermined information from a plurality of pieces of information stored in the database DB. The extension number, the transfer setting, and the transfer destination correspond to telephone communication processing information used for connection processing or the like of an extension call.

The name in the key information indicates the name of the user of the extension service, and the telephone number in the key information indicates the telephone number of the mobile phone or the like of the user of the extension service. The company in the key information indicates the company to which the user of the extension service belongs, and the base in the key information indicates the base of the user of the extension service. The extension number in the telephone communication processing information indicates the telephone number for the extension call of the user of the extension service, and the transfer setting in the telephone communication processing information indicates whether or not to transfer the telephone call addressed to the user of the extension service. The transfer destination in the telephone communication processing information indicates a telephone number of a transfer destination in a case in which a telephone call addressed to a user of the extension service is transferred. The reception date and time indicates, for example, a date and time when the content stored in each record R is updated.

In the database DB illustrated in FIG. 5, the plurality of telephone numbers stored in the database DB are mutually different telephone numbers. In this case, the database DB may have the plurality of records R corresponding to a plurality of telephone numbers on a one-to-one basis. Then, the telephone number may be used as identification information for identifying one record R among the plurality of records R.

It is to be noted that the database DB is not limited to the example illustrated in FIG. 5. For example, the name is not necessarily stored in the database DB. Alternatively, identification information for identifying one record R from among the plurality of records R may be stored in the database DB instead of the name.

FIG. 6 is an explanatory diagram illustrating an example of update information UINF illustrated in FIG. 1.

The update information UINF stores, for example, a plurality of pieces of registration information corresponding to a plurality of registration items such as a name, a telephone number, a company, a base, an extension number, a transfer setting, a transfer destination, and a reception date and time for each record R to be updated. The reception date and time indicates, for example, the date and time when the active process executor 122 has received the instruction information CINF. It is to be noted that, in FIG. 6, the record R stored in the update information UINF is assigned with the same reference sign as the corresponding record R among the plurality of records R of the database DB in order to facilitate understanding of the correspondence with the record R of the database DB.

For example, the record R2 of the update information UINF corresponds to the record R2 among the plurality of records R of the database DB. Furthermore, the content of the record R2 of the update information UINF indicates the content of the instruction information CINF received by the active process executor 122 at 13:06 on Mar. 23, 2021 (the content of the record R2 after the update). Furthermore, for example, the content of the record R4 of the update information UINF indicates the content of the instruction information CINF received by the active process executor 122 at 13:07:59 on Mar. 23, 2021 (the content of the record R4 after the update). In this manner, the update information UINF indicates a history of the instruction information CINF for updating the storage content of the database DB. It is to be noted that, in the present embodiment, the instruction information CINF includes, for example, all of the plurality of pieces of registration information stored in the record R updated on the basis of the instruction information CINF.

Here, for example, the active process executor 122 causes the terminal device 500 to display all of the plurality of pieces of registration information stored in the record R updated on the basis of the instruction information CINF. As a result, the administrator Cer can easily recognize the current registered content of the record R corresponding to the update target user.

It is to be noted that the update information UINF is not limited to the example illustrated in FIG. 6. For example, similarly to the database DB, the name is not necessarily stored in the update information UINF. Alternatively, identification information for identifying one record R from the plurality of records R may be stored in the update information UINF in place of the name. Furthermore, for example, the reception date and time may be a date and time when the terminal device 500 receives an operation (operation by the administrator Cer) for generating the instruction information CINF, or may be a date and time when the information accumulation device 300 receives the instruction information CINF.

Figure 7:
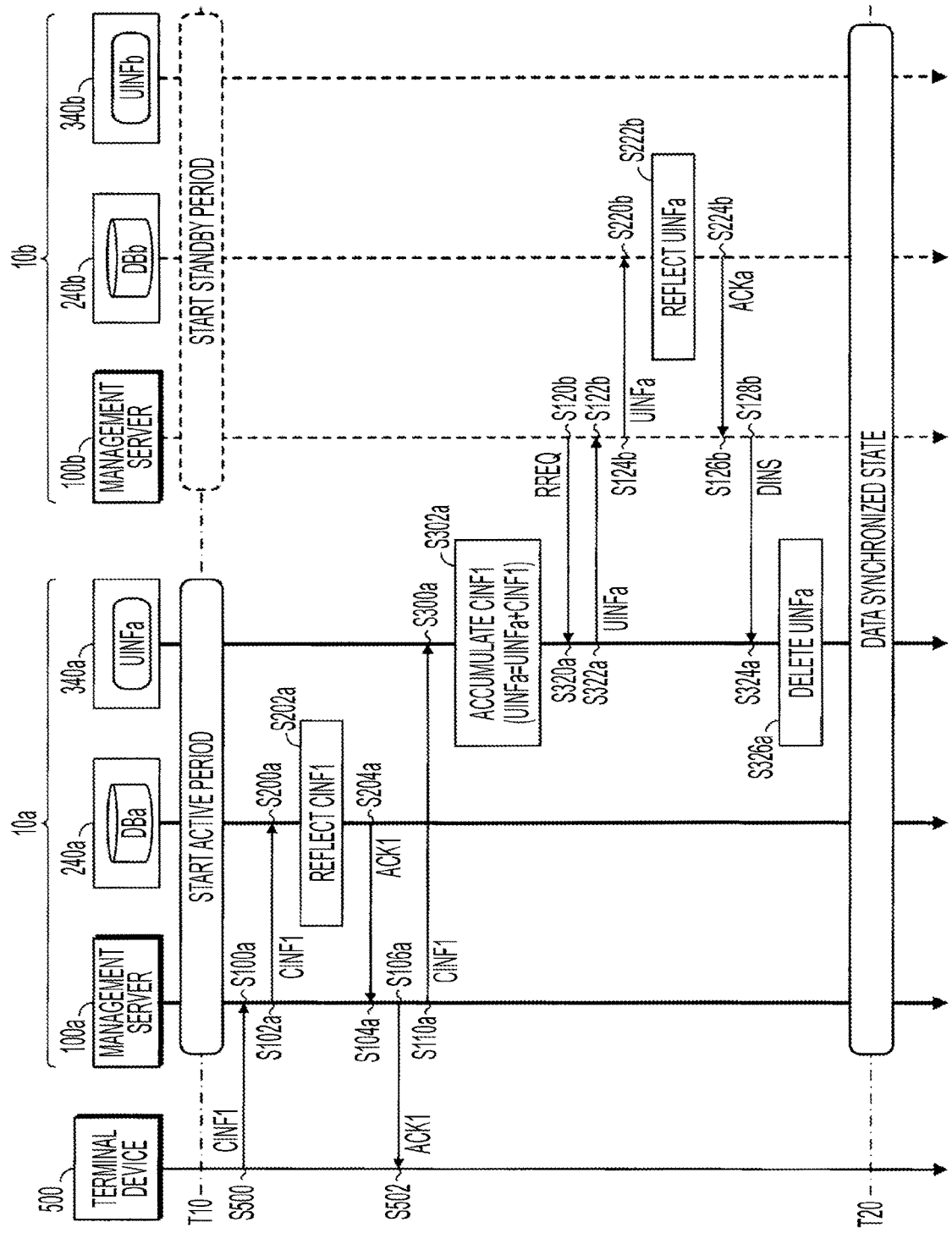
FIG. 7 is a sequence chart illustrating an example of operations of the redundant system illustrated in FIG. 1.

FIG. 7 is a sequence chart illustrating an example of operations of the redundant system 1 illustrated in FIG. 1. It is to be noted that FIG. 7 illustrates an example of the operations of the redundant system 1 from time T10 when the active period of the system 10*a* and the standby period of the system 10*b* are started to time T20 when the databases DBa and DBb are synchronized with each other. That is, in the example illustrated in FIG. 7, the system 10*a* operates as an active system, and the system 10*b* operates as a standby system. Solid arrows in FIG. 7 each indicate the flow of the operation of the active system 10*a*, and broken arrows each indicate the flow of the operation of the standby system 10*b*.

It is to be noted that, in FIG. 7, and in FIGS. 8 and 9 that will be described later, in order to facilitate understanding of the steps to be executed by the system 10*a* and the steps to be executed by the system 10*b*, a lower case letter (a or b) has been added to the end of the reference signs of the steps to be executed by each system 10. For example, the processing in step S100*a* in FIG. 7 indicates the processing in step S100 (reception of the instruction information CINF1) to be executed by the management server 100a. Processing in step S100b in FIG. 8 that will be described later indicates processing in step S100 (reception of instruction information CINF3) to be executed by the management server 100b.

Figure 8:
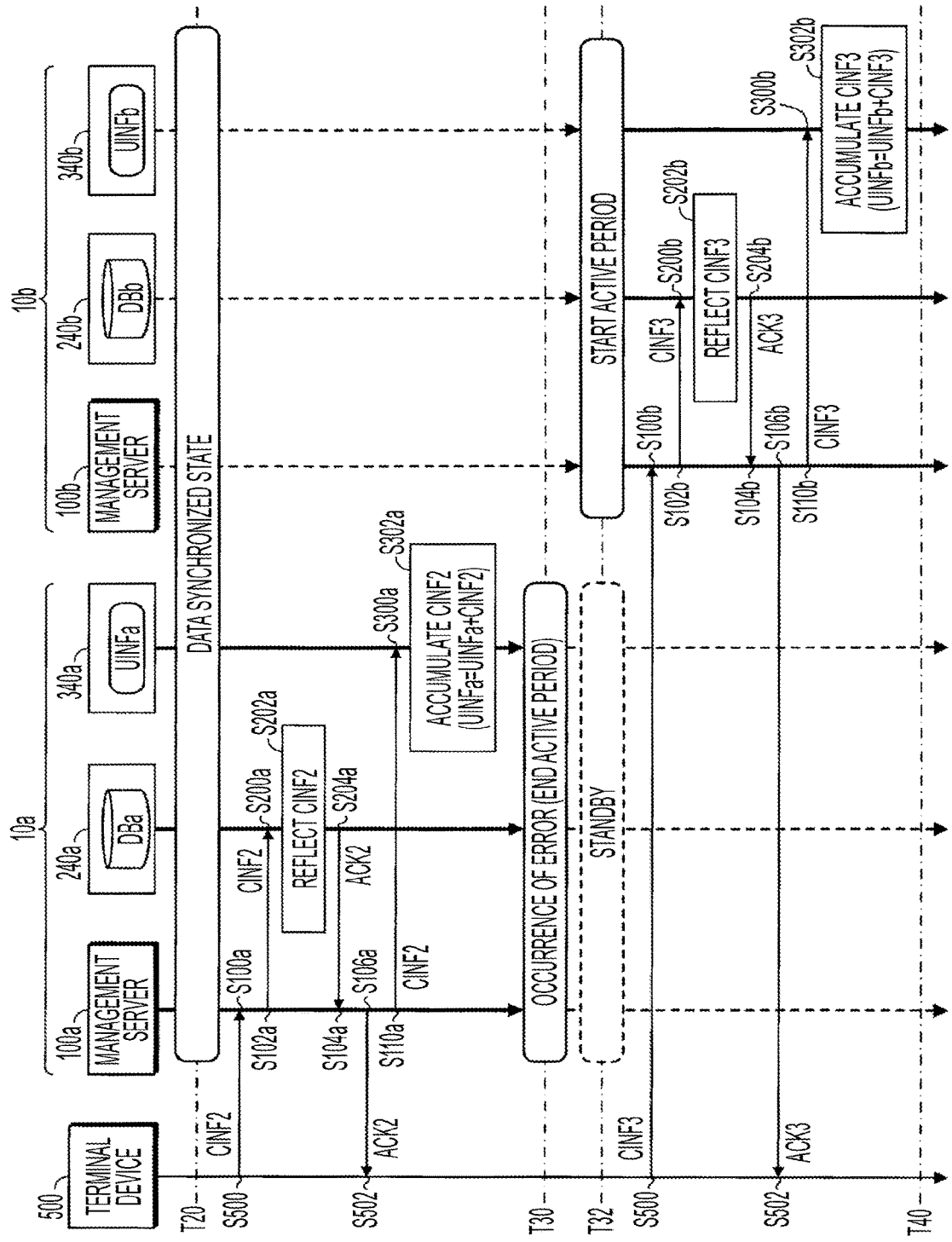
FIG. 8 is a sequence chart illustrating another example of operations of the redundant system illustrated in FIG. 1.
Figure 9:
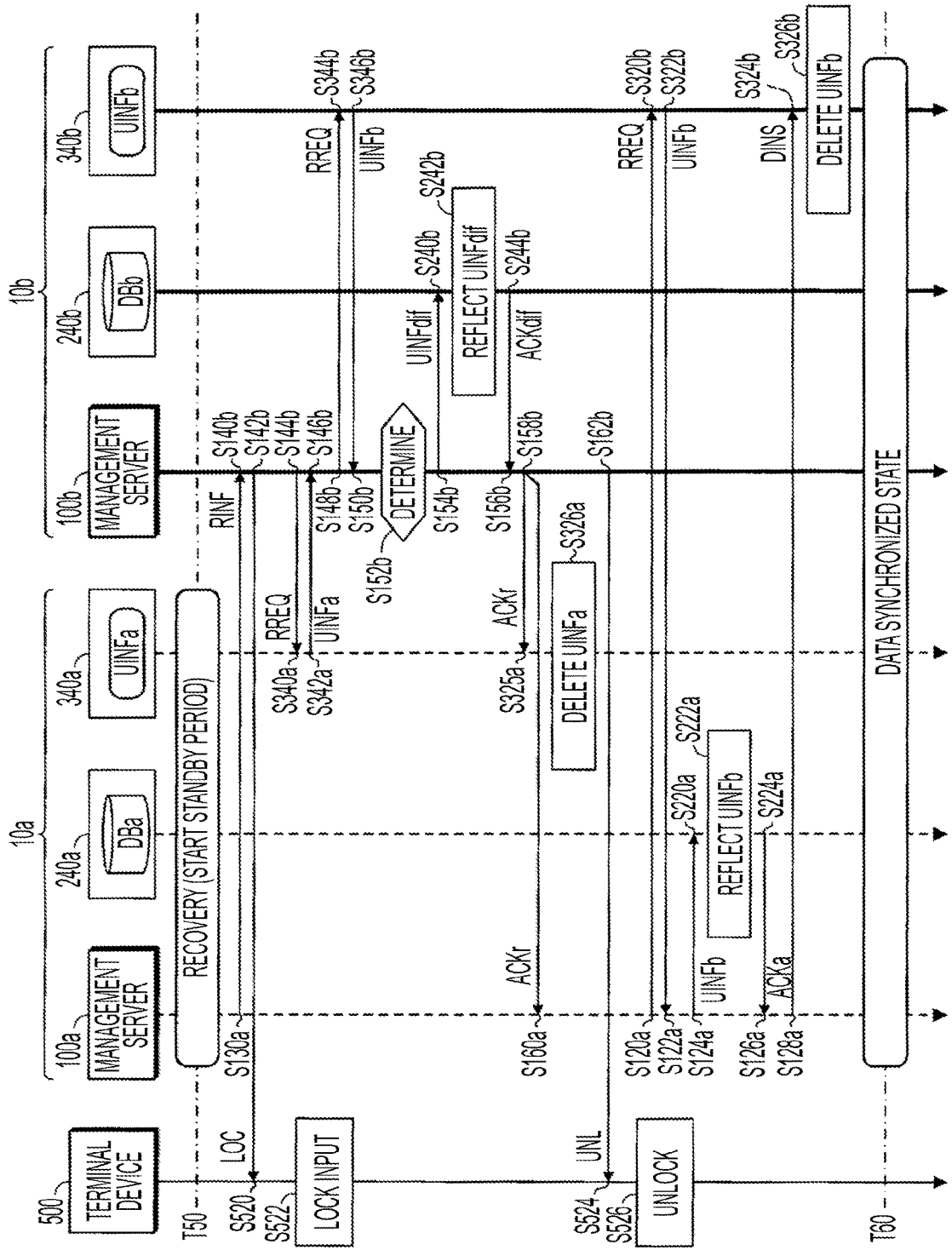
FIG. 9 is a sequence chart illustrating another example of operations of the redundant system illustrated in FIG. 1.

In FIGS. 7, 8, and 9, in order to avoid complicated explanation, the operations of the active process executor 122 and the operations of the standby process executor 124 may be described as operations of the management server 100 without being particularly distinguished. The operations of the management server 100 of the system 10 operating as the active system are executed by the active process executor 122, and the operations of the management server 100 of the system 10 operating as the standby system are executed by the standby process executor 124. Furthermore, the operations of the database server 200 are executed by the controller 222, and the operations of the information accumulation device 300 are executed by the controller 322.

First, the terminal device 500 receives an operation by the administrator Cer of the database DB, and transmits instruction information CINF1 generated on the basis of the received operation to the management server 100a (S500). The management server 100a receives the instruction information CINF1 from the terminal device 500 (S100a). In this manner, the management server 100a receives the instruction information CINF1 for updating the storage content of the database DBa. It is to be noted that, more specifically, transmission and reception of information such as the instruction information CINF1 is executed via a communication device (for example, the communication device 160 or the like) of each device such as the management server 100, but in FIG. 7, in order to avoid complication of the description, the description will be simplified.

The management server 100a transmits the instruction information CINF1 received from the terminal device 500 to the database server 200a in order to update the storage content of the database DBa on the basis of the instruction information CINF1 received from the terminal device 500 (S102a). The database server 200a receives the instruction information CINF1 from the management server 100a (S200a). Then, the database server 200a reflects the content of the instruction information CINF1 received from the management server 100a in the database DBa (S202a). That is, the database server 200a updates the database DBa on the basis of the instruction information CINF1 received from the management server 100a. Then, the database server 200a transmits to the management server 100a response information ACK1 indicating that the content of the instruction information CINF1 has been reflected in the database DBa (S204a).

The management server 100a receives the response information ACK1 from the database server 200a (S104a). Then, the management server 100a transmits the response information ACK1 (for example, the response information ACK1 received from the database server 200a) indicating that the content of the instruction information CINF1 has been reflected in the database DBa to the terminal device 500 (S106a). The terminal device 500 receives the response information ACK1 from the management server 100a (S502). As a result, the terminal device 500 can recognize that the content of the instruction information CINF1 has been reflected in the database DBa. For example, the terminal device 500 may display on the display of the terminal device 500 information indicating that the content of the instruction information CINF1 has been reflected in the database DBa. In this case, the administrator Cer can understand that the content of the instruction information CINF1 has been reflected in the database DBa.

The management server 100a transmits the instruction information CINF1 received from the terminal device 500 to the information accumulation device 300a (S110a). The information accumulation device 300a receives the instruction information CINF1 from the management server 100a (S300a). Then, the information accumulation device 300a accumulates the instruction information CINF1 received from the management server 100a in the storage device 340a as the update information UINFa (S302a).

As described above, in response to a reception of the instruction information CINF1 during a period in which the system 10a operates as the active system, the active process executor 122a of the management server 100a updates the storage content of the database DBa on the basis of the instruction information CINF1 via the database server 200a. Furthermore, in response to a reception of the instruction information CINF1 during a period in which the system 10a operates as the active system, the active process executor 122a accumulates the instruction information CINF1 in the storage device 340a as the update information UINFa via the information accumulation device 300a.

It is to be noted that the management server 100b of the system 10b operating as the standby system transmits a read request RREQ for requesting reading of the update information UINFa accumulated in the storage device 340a to the information accumulation device 300a of the system 10a (S120b). For example, the management server 100b periodically transmits the read request RREQ to the information accumulation device 300a. The information accumulation device 300a receives the read request RREQ from the management server 100b (S320a). Then, the information accumulation device 300a transmits the update information UINFa accumulated in the storage device 340a to the management server 100b as a response to the read request RREQ (S322a). In a case in which the update information UINFa is not accumulated in the storage device 340a, the information accumulation device 300a may transmit, as a response to the read request RREQ, information indicating that the update information UINFa is not accumulated in the storage device 340a to the management server 100b.

The management server 100b receives the update information UINFa from the information accumulation device 300a as a response to the read request RREQ (S122b). Then, in order to update the storage content of the database DBb on the basis of the update information UINFa acquired from the storage device 340a, the management server 100b transmits the update information UINFa acquired from the storage device 340a to the database server 200b (S124b).

The database server 200b receives the update information UINFa from the management server 100b (S220b). Then, the database server 200b reflects the content of the update information UINFa received from the management server 100b in the database DBb (S222b). That is, the database server 200b updates the database DBb on the basis of the update information UINFa received from the management server 100b. Then, the database server 200b transmits response information ACKa indicating that the content of the update information UINFa has been reflected in the database DBb to the management server 100b (S224b).

The management server 100b receives the response information ACKa from the database server 200b (S126b). Then, the management server 100b transmits deletion instruction information DINS instructing deletion of the update information UINFa accumulated in the storage device 340a to the information accumulation device 300a (S128b). The information accumulation device 300*a* receives the deletion instruction information DINS from the management server 100*b* (S324*a*). Then, the information accumulation device 300*a* deletes the update information UINFa from the storage device 340*a* on the basis of the deletion instruction information DINS (S326*a*).

As described above, in a case in which the update information UINFa is accumulated in the storage device 340*a* while the system 10*b* operates as the standby system, the standby process executor 124*b* of the management server 100*b* acquires the update information UINFa from the storage device 340*a*. Then, the standby process executor 124*b* updates the storage content of the database DBb via the database server 200*b* on the basis of the update information UINFa acquired from the storage device 340*a*. Furthermore, when the storage content of the database DBb is updated on the basis of the update information UINFa, the standby process executor 124*b* transmits the deletion instruction information DINS instructing deletion of the update information UINFa accumulated in the storage device 340*a* to the system 10*a*.

By executing the processing of step S222*b* and the like described above, for example, the resulting storage content of the database DBb matches the storage content of the database DBa. That is, the databases DBa and DBb are synchronized with each other.

As described above, in the present embodiment, the management server 100*b* of the system 10*b* can match the storage content of the database DBb with the storage content of the database DBa without accessing the database DBa of the system 10*a*. As a result, in the present embodiment, for example, even during execution of synchronization processing for synchronizing the databases DBa and DBb with each other, the call processing server 400*a*, the management server 100*a*, and the like can access the database DBa without waiting until the synchronization processing is completed. Therefore, in the present embodiment, it is possible to reduce or prevent the synchronous processing from affecting the connection processing of the extension call by the call processing server 400*a* and the update processing of the database DBa by the management server 100*a*.

Hereinafter, the processing of accumulating the instruction information CINF in the storage device 340 as the update information UINF (for example, a series of processing of steps S110*a*, S300*a*, and S302*a*) is also referred to as accumulation processing. Processing reflecting the content of the update information UINF accumulated in the storage device 340 in the database DB (for example, a series of processing of steps S120*b* to S128*b*, S220*b* to S224*b*, and S320*a* to S326*a*) is also referred to as reflection processing. For example, processing including the accumulation processing and the reflection processing corresponds to the synchronization processing.

FIG. 8 is a sequence chart illustrating another example of the operations of the redundant system 1 illustrated in FIG. 1. Processes substantially the same as those shown in FIG. 7 are denoted using the same reference signs, and detailed description thereof will be omitted. It is to be noted that FIG. 8 illustrates an example of the operations of the redundant system 1 in a case in which the active period is started in the system 10*b* due to the occurrence of an error such as a failure in the system 10*a* operating as the active system. For example, the operations of the redundant system 1 illustrated in FIG. 8 corresponds to the operations of the redundant system 1 after the time T20 illustrated in FIG. 7.

In FIG. 8, it is assumed that an error occurs in the system 10*a* operating as the active system, and the active period is started in the system 10*b* before the standby process executor 124*b* acquires the update information UINFa accumulated in the storage device 340*a*. For example, the databases DBa and DBb are synchronized with each other at the time T20 before the terminal device 500 transmits the instruction information CINF2 (S500). Then, at a time T30 after the time T20, an error occurs in the system 10*a* before the standby process executor 124*b* acquires the update information UINFa accumulated in the storage device 340*a*.

The operations, up until the instruction information CINF2 is accumulated in the storage device 340*a*, are substantially the same as the operations up until the instruction information CINF1 is accumulated in the storage device 340*a* shown in FIG. 7. For example, the terminal device 500 transmits the instruction information CINF2 to the management server 100*a* (S500). The management server 100*a* receives the instruction information CINF2 from the terminal device 500 and transmits the instruction information CINF2 to the database server 200*a* (S100*a* and S102*a*). The database server 200*a* receives the instruction information CINF2 from the management server 100*a*, and reflects, in the database DBa (S200*a* and S202*a*), the content of the instruction information CINF2. Then, the database server 200*a* transmits response information ACK2, indicating that the content of the instruction information CINF2 has been reflected in the database Dba, to the management server 100*a* (S204*a*).

The management server 100*a* receives the response information ACK2 from the database server 200*a* and transmits the response information ACK2 to the terminal device 500 (S104*a* and S106*a*). The terminal device 500 receives the response information ACK2 from the management server 100*a* (S502). The management server 100*a* transmits the instruction information CINF2 received from the terminal device 500 to the information accumulation device 300*a* (S110*a*). The information accumulation device 300*a* receives the instruction information CINF2 from the management server 100*a*, and accumulates the instruction information CINF2 in the storage device 340*a* as the update information UINFa (S300*a* and S302*a*).

Then, an error occurs in the system 10*a* at a time T30 before the standby process executor 124*b* acquires the update information UINFa accumulated in the storage device 340*a*. Therefore, at time T32, the active period is started in the system 10*b* in a state in which the storage content of the database DBb is different from the storage content of the database DBa. Since the system 10*b* operates as the active system, the management server 100*b* receives the instruction information CINF for updating the storage content of the database DBb.

For example, the terminal device 500 transmits the instruction information CINF3 to the management server 100*a* (S500). The management server 100*b* receives the instruction information CINF3 from the terminal device 500 and transmits the instruction information CINF3 to the database server 200*a* (S100*b* and S102*b*). The database server 200*b* receives the instruction information CINF3 from the management server 100*b*, and reflects, in the database DBb (S200*b* and S202*b*), the content of the instruction information CINF3. Then, the database server 200*b* transmits response information ACK3 indicating that the content of the instruction information CINF3 has been reflected in the database DBb to the management server 100*b* (S204*b*).

The management server 100b receives the response information ACK3 from the database server 200b, and transmits the response information ACK3 to the terminal device 500 (S104b and S106b). The terminal device 500 receives the response information ACK3 from the management server 100b (S502). The management server 100b transmits the instruction information CINF3 received from the terminal device 500 to the information accumulation device 300b (S110b). The information accumulation device 300b receives the instruction information CINF3 from the management server 100b, and accumulates the instruction information CINF3 in the storage device 340b as the update information UINFb (S300b and S302b).

The update information UINFb accumulated in the storage device 340b is used by the system 10a to match the storage content of the database DBa with the storage content of the database DBb, for example, when the system 10a is recovered.

As described above, in the present embodiment, even when an error occurs in one of the systems 10a and 10b, the other of the systems 10a and 10b operates as the active system, and thus, it is possible to continuously provide a predetermined service such as an extension service.

FIG. 9 is a sequence chart illustrating another example of the operations of the redundant system 1 illustrated in FIG. 1. Processes substantially the same as those described in FIGS. 7 and 8 are denoted by the same reference signs, and detailed description thereof will be omitted. It is to be noted that FIG. 9 illustrates an example of the operations of the redundant system 1 in a case in which the system 10a recovers from the error. For example, the operations of the redundant system 1 illustrated in FIG. 9 correspond to the operations of the redundant system 1 when the system 10a is recovered at a time T50 that is later than the time T40 illustrated in FIG. 8.

The system 10a starts operation as a standby system by recovering from the error. That is, at the time T50, the standby period is started in the system 10a. The management server 100a transmits a recovery notification RINF indicating that the system 10a is recovered to the management server 100b in response to the recovery of the system 10a (S130a). The management server 100b receives the recovery notification RINF from the management server 100a (S140b). Then, the management server 100b transmits the input lock information LOC indicating that the reception of the instruction information CINF is stopped to the terminal device 500 upon receipt of the recovery notification RINF (S142b).

The terminal device 500 receives the input lock information LOC from the management server 100b (S520). Then, the terminal device 500 locks the input of the instruction to the management server 100b (S522). For example, the terminal device 500 stops receiving the operation for generating the instruction information CINF.

The management server 100b of the system 10b transmits a read request RREQ for requesting reading of the update information UINFa accumulated in the storage device 340a to the information accumulation device 300a of the system 10a (S144b).

The information accumulation device 300a receives the read request RREQ from the management server 100b (S340a). Then, the information accumulation device 300a transmits the update information UINFa accumulated in the storage device 340a to the management server 100b as a response to the read request RREQ (S342a). In a case in which the update information UINFa is not accumulated in the storage device 340a, the information accumulation device 300a may transmit information indicating that the update information UINFa is not accumulated in the storage device 340a to the management server 100b as a response to the read request RREQ.

The management server 100b receives the update information UINFa from the information accumulation device 300a as a response to the read request RREQ (S146b). In addition, the management server 100b transmits the read request RREQ for requesting reading of the update information UINFb accumulated in the storage device 340b to the information accumulation device 300b (S148b).

The information accumulation device 300b receives the read request RREQ from the management server 100b (S344b). Then, the information accumulation device 300b transmits the update information UINFb accumulated in the storage device 340b to the management server 100b as a response to the read request RREQ (S346b). In a case in which the update information UINFb is not accumulated in the storage device 340b, the information accumulation device 300b may transmit to the management server 100b information indicating that the update information UINFb is not accumulated in the storage device 340b as a response to the read request RREQ.

The management server 100b receives the update information UINFb from the information accumulation device 300b as a response to the read request RREQ (S150b). Then, the management server 100b determines whether to execute recovery processing reflecting the content of the update information UINFa in the database DBb on the basis of the update information UINFa and UINFb (S152b). A specific example of a method of determining whether to execute the recovery processing will be described later with reference to FIG. 10. In the example illustrated in FIG. 9, a case in which the recovery processing is executed, that is, a case in which the management server 100b determines to execute the recovery processing is assumed.

For example, the management server 100b transmits the update information UINFdif indicating contents unreflected in the database DBb among the update contents indicated by the update information UINFa to the database server 200b (S154b).

The database server 200b receives the update information UINFdif from the management server 100b (S240b). Then, the database server 200b reflects the content of the update information UINFdif received from the management server 100b in the database DBb (S242b). That is, the database server 200b reflects the content of the unreflected instruction information CINF, which has not been reflected in the database DBb due to the occurrence of the error in the system 10a, in the database DBb. As a result, the storage content of the database DBb after the system 10a is recovered becomes the storage content the same as the storage content of the database DBb of a case in which the active period of the system 10b is started with the storage content of the database DBb matching the storage content of the database DBa.

As described above, in the present embodiment, the storage content of the database DBb after the system 10a is recovered can be set to the same content as the storage content of the database DBb of a case in which the active period of the system 10b is started with the databases DBa and DBb being synchronized with each other.

The database server 200b transmits response information ACKdif indicating that the content of the update information UINFdif has been reflected in the database DBb to the management server 100b (S244b).

The management server 100b receives the response information ACKdif from the database server 200b (S156b). Then, as a response to the recovery notification RINF, the management server 100b transmits response information ACKr indicating that the recovery processing has been completed to the management server 100a and the information accumulation device 300a of the system 10a (S158b).

The information accumulation device 300a receives the response information ACKr from the management server 100b (S325a). Then, since the recovery processing has been completed, the information accumulation device 300a deletes the update information UINFa from the storage device 340a (S326a). Instead of transmitting the response information ACKr to the information accumulation device 300a, the management server 100b may transmit deletion instruction information DINS instructing deletion of the update information UINFa accumulated in the storage device 340a to the information accumulation device 300a.

The management server 100b transmits unlocking information UNL indicating that the stop of receiving the instruction information CINF is to be canceled, to the terminal device 500 upon receipt of the response information ACKdif (S162b).

The terminal device 500 receives the unlocking information UNL from the management server 100b (S524). Then, the terminal device 500 unlocks the input of the instruction to the management server 100b (S526). For example, the terminal device 500 resumes receiving an operation for generating the instruction information CINF.

As described above, in the present embodiment, in a case in which the recovery of the system 10a is detected, the active process executor 122b stops receiving the instruction information CINF until the determination as to whether to execute the recovery processing is completed. As a result, in the present embodiment, it is possible to reduce or prevent generation of new instruction information CINF during the determination of whether to execute the recovery processing. As a result, in the present embodiment, it is possible to reduce or prevent complication of the determination processing as to whether to execute the recovery processing.

Furthermore, in the present embodiment, when the active process executor 122b has determined to execute the recovery processing, the active process executor 122b stops receiving the instruction information CINF until the recovery processing is completed. As a result, in the present embodiment, it is possible to reduce or prevent generation of new instruction information CINF during the execution of the recovery processing. As a result, in the present embodiment, it is possible to reduce or prevent complication of the recovery processing.

Furthermore, the management server 100a can recognize that the recovery processing has been completed by receiving the response information ACKr from the management server 100b (S160a). Then, since the recovery processing has been completed, the management server 100a executes the reflection processing in cooperation with the database server 200a and the information accumulation device 300b of the system 10b (S120a to S128a, S220a to S224a, and S320b to S326b). As a result, for example, at a time T60, the databases DBa and DBb are synchronized with each other.

Figure 10:
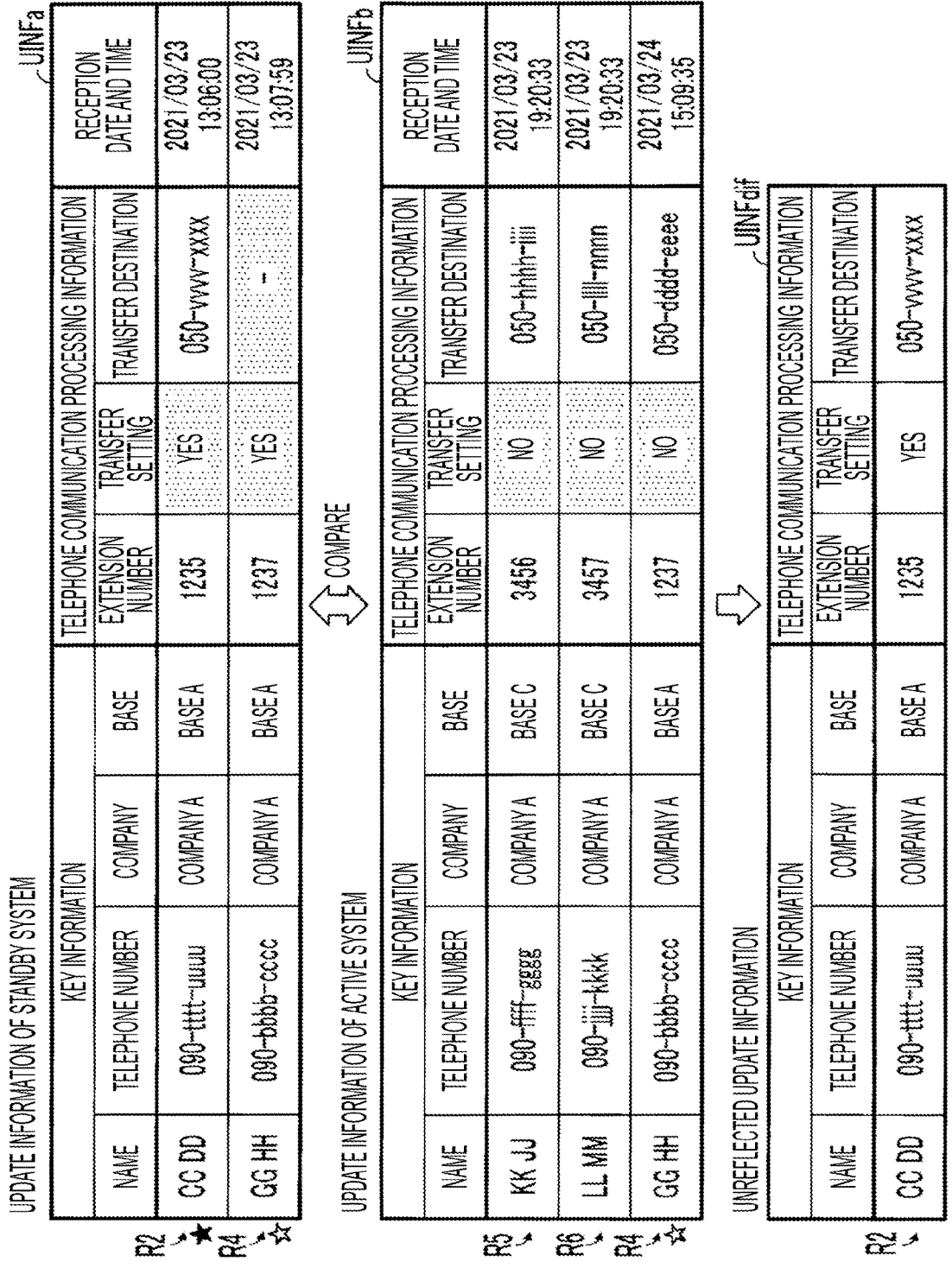
FIG. 10 is an explanatory diagram for describing determination processing of determining whether to execute recovery processing.

FIG. 10 is an explanatory diagram for describing determination processing of determining whether to execute recovery processing. In FIG. 10, as in FIGS. 8 and 9 described above, it is assumed that an error has occurred in the system 10a before the standby process executor 124b acquires the update information UINFa accumulated in the storage device 340a. Furthermore, in FIG. 10, an item updated by the instruction information CINF among a plurality of items in each record R of the database DB is indicated by shading. In FIG. 10, in order to facilitate understanding of the description, determination processing and the like will be described on the basis of the operation of the redundant system 1 illustrated in FIGS. 8 and 9 described above.

The update information UINFa of the standby system indicates the update information UINFa accumulated in the storage device 340a at the time when the error occurs in the system 10a (time T30 in FIG. 8). For example, instruction information CINF indicating update contents for each of records R2 and R4 of the database DBa is accumulated in the storage device 340a as update information UINFa.

The update information UINFb of the active system indicates the update information UINFb accumulated in the storage device 340b in a period from the time (for example, time T32 in FIG. 8) when the active period is started in the system 10b to the time (for example, time T50 in FIG. 9) when the system 10a is recovered. For example, instruction information CINF indicating update contents for each of records R5, R6, and R4 of the database DBb is accumulated in the storage device 340b as the update information UINFb.

For example, the active process executor 122b of the management server 100b compares the update information UINFa accumulated in the storage device 340a with the update information UINFb accumulated in the storage device 340b upon receipt of the recovery notification RINF. A black star in FIG. 10 indicates a record R2 different from the records R5, R6, and R4 indicated by the update information UINFb among the records R2 and R4 indicated by the update information UINFa. Furthermore, each white star in FIG. 10 indicates, among the records R2 and R4 indicated by the update information UINFa, the record R4 that is the same as the records R5, R6, and R4 indicated by the update information UINFb.

In the example illustrated in FIG. 10, among the records R2 and R4 indicated by the update information UINFa, the record R2 is a record R different from the records R5, R6, and R4 indicated by the update information UINFb. Therefore, the record R2 of the database DBb has not been updated since the time T20 in FIG. 8, for example.

That is, in the example illustrated in FIG. 10, one or more records R (R2 and R4) indicated by the update information UINFa include an unreflected record R (R2) different from one or more records R (R5, R6 and R4) indicated by the update information UINFb. In this case, the active process executor 122b determines to execute the recovery processing. Then, the active process executor 122b reflects the content of the unreflected record R (R2) indicated by the update information UINFa in the database DBb.

For example, the active process executor 122b transmits to the database server 200b the update information UINFdif indicating the update content of the unreflected record R2 among the update content (the update content of the records R2 and R4) indicated by the update information UINFa. As a result, the content of the unreflected update information UINFdif that has not been reflected in the database DBb due to an occurrence of an error or the like in the system 10a is reflected in the database DBb.

As described above, in the present embodiment, for example, when the system 10a is recovered, the databases DBa and DBb can be synchronized with each other without comparing all the information stored in the database DBb with all the information stored in the database DBa. For example, a mode (hereinafter also referred to as "comparative example") is conceivable of comparing all the information stored in the active system database DB with all the information stored in the standby system (the previously active system) database DB after the recovery of the system 10 the previously active system 10) in which an error such as a failure has occurred. In the comparative example, since the storage contents of the two databases DB are compared, the amount of comparison increases as compared with the present embodiment in which the contents of the two pieces of update information UINF are compared. In other words, in the present embodiment, the amount of comparison for the recovery processing can be reduced as compared with the comparative example. Therefore, in the present embodiment, it is possible to reduce or prevent increase in the load of the recovery processing.

It is to be noted that, for example, in the example illustrated in FIG. 10, if both of the records R2 and R4 are included in the plurality of records R indicated by the update information UINFb, since there is no unreflected record R, the active process executor 122b determines not to execute the recovery processing. In this case, for example, the series of processing of steps S154b, S156b, S240b, S242b, and S244b illustrated in FIG. 9 is not executed.

In a case in which the update information UINFa has been accumulated in the storage device 340a and in which no update information UINFb has been accumulated in the storage device 340b, the active process executor 122b determines to execute the recovery processing. In this case, the active process executor 122b transmits the update information UINFa accumulated in the storage device 340a to the database server 200b as the unreflected update information UINFdif. That is, in a case in which no update information UINFb has been accumulated in the storage device 340b, the active process executor 122b reflects the contents of all the records R indicated by the update information UINFa in the database DBb. It is to be noted that the determination based on the update information UINFa having been accumulated in the storage device 340a and no update information UINFb having been accumulated in the storage device 340b is included in the determination based on the update information UINFa and UINFb.

As described above, in the present embodiment, the management server 100a included in the system 10a of the redundant system 1 in which one of the systems 10a and 10b operates as the active system and the other operates as the standby system includes the active process executor 122a and the standby process executor 124a.

The active process executor 122a receives the instruction information CINF for updating the storage content of the database DBa included in the system 10a during a period in which the system 10a operates as the active system (active period of the system 10a). In response to a reception of the instruction information CINF during the active period of the system 10a, the active process executor 122a updates the storage content of the database DBa on the basis of the instruction information CINF, and accumulates the instruction information CINF in the storage device 340a included in the system 10a as the update information UINFa.

In a case in which the update information UINFb has been accumulated in the storage device 340b included in the system 10b during a period (standby period of the system 10a) in which the system 10a operates as the standby system, the standby process executor 124a acquires the update information UINFb from the storage device 340b. Then, the standby process executor 124a updates the storage content of the database DBa on the basis of the update information UINFb. It is to be noted that the update information UINFb is update information UINF used to update the storage content of the database DBb included in the system 10b.

In a case in which an error occurs in the system 10b operating as the active system, the active period in the system 10a may be started before the standby process executor 124a acquires the update information UINFb accumulated in the storage device 340b. In this case, the active process executor 122a determines whether to execute recovery processing reflecting the content of the update information UINFb in the database DBa on the basis of the update information UINFa and UINFb upon recovery of the system 10b.

In this manner, the active process executor 122a determines whether to execute the recovery processing on the basis of the update information UINFa and UINFb. Therefore, in the present embodiment, for example, it is possible to reduce or prevent the processing load of the determination as to whether to execute the recovery processing from increasing as compared with a method of executing the recovery processing on the basis of the comparison result of the storage contents of the two databases DB. That is, in the present embodiment, it is possible to synchronize the database DB of the standby system with the database DB of the active system while reducing or preventing an increase in the processing load of the resynchronization after the system 10 (the previously active system 10) in which an error such as a failure that has occurred has been recovered.

Furthermore, in the present embodiment, in a case in which the storage content of the database DBa is updated on the basis of the update information UINFb, the standby process executor 124a transmits to the system 10b deletion instruction information DINS instructing deletion of the update information UINFb accumulated in the storage device 340b. As a result, in the present embodiment, it is possible to reduce or prevent the update information UINFb that has been already reflected in the database DBa from being accumulated in the storage device 340b. In the present embodiment, since the update information UINFb that has already been reflected in the database DBa is deleted from the storage device 340b, the update information UINFb that has not been reflected in the database DBa can be easily acquired from the storage device 340b.

Furthermore, in the present embodiment, in a case in which the active process executor 122a detects the recovery of the system 10b, the active process executor 122a stops receiving the instruction information CINF until the determination as to whether to execute the recovery processing is completed. As a result, in the present embodiment, it is possible to reduce or prevent a change in the update information UINFa (the instruction information CINF accumulated in the storage device 340a) used for the determination processing of determining whether to execute the recovery processing. As a result, in the present embodiment, it is possible to reduce or prevent complication of the determination processing as to whether to execute the recovery processing.

Furthermore, in the present embodiment, each of the databases DBa and DBb includes a plurality of records R in which a plurality of pieces of registration information is stored. In determining whether to execute the recovery processing, the active process executor 122a determines to execute the recovery processing in a case in which one or more records R indicated by the update information UINFb include an unreflected record R different from one or more records R indicated by the update information UINFa. Then, the active process executor 122a reflects the content of the unreflected record R indicated by the update information UINFb in the database DBa.

As described above, in the present embodiment, for example, when the system 10b has been recovered, the recovery processing can be executed without comparing all the information stored in the database DBa with all the information stored in the database DBb. Therefore, in the present embodiment, it is possible to reduce or prevent the load of the recovery processing from increasing as compared with a method of executing the recovery processing on the basis of the comparison result of the storage contents of the two databases DB. Furthermore, in the present embodiment, the determination as to whether to execute the recovery processing is performed in units of the record R of the database DB. Therefore, in the present embodiment, the determination as to whether to execute the recovery processing can be easily performed compared with a case in which the determination as to whether to execute the recovery processing is performed in units of registration items of the record R.

Furthermore, in the present embodiment, the active process executor 122a causes the terminal device 500 that receives the operation for generating the instruction information CINF to display all of the plurality of pieces of registration information stored in the record R updated on the basis of the instruction information CINF. As a result, in the present embodiment, the administrator Cer who operates the terminal device 500 can easily understand the current registered content of the record R to be updated. Furthermore, in the present embodiment, the instruction information CINF includes all of the plurality of pieces of registration information stored in the record R updated on the basis of the instruction information CINF. As a result, in the present embodiment, for example, in specifying the update content by way of an operation for generating the instruction information CINF, the administrator Cer can easily confirm the registered content after the update of the record R to be updated.

2. Modifications

The present invention is not limited to the embodiment exemplified above. Specific aspects of modification are exemplified below. Two or more aspects randomly selected from the following examples may be combined.

First Modification

In the embodiment described above, the operations are not particularly described of the redundant system 1 in a case in which the management server 100 operating as the active system is restarted. However, when the management server 100 operating as the active system is restarted, the redundant system 1 may operate as illustrated in FIG. 11.

Figure 11:
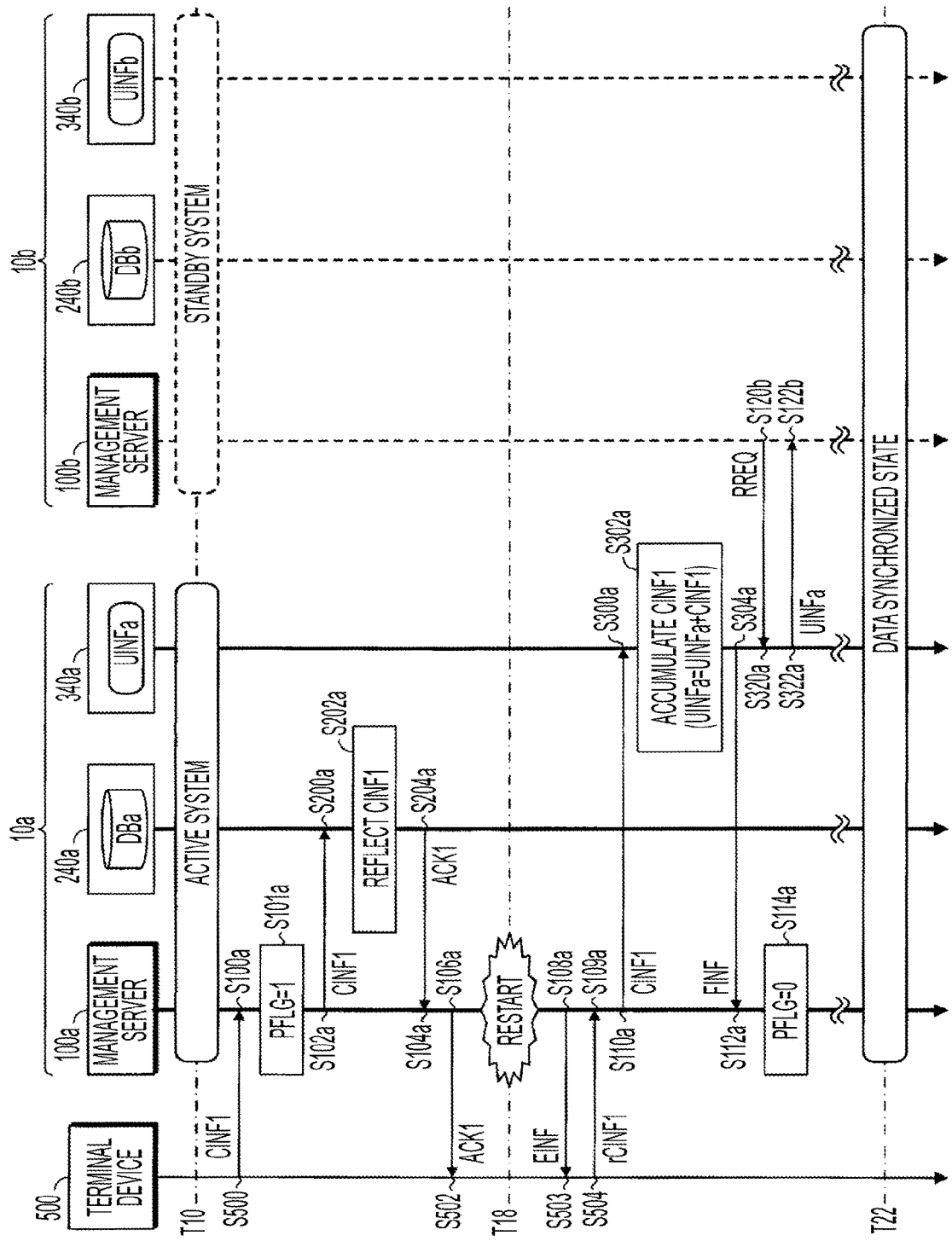
FIG. 11 is a sequence chart illustrating an example of operations of a redundant system using a management server according to a first modification.

FIG. 11 is a sequence chart illustrating an example of operations of a redundant system 1 using a management server 100 according to a first modification. The operations shown in FIG. 11 correspond to the operations shown in FIG. 7. In FIG. 11, it is assumed that the management server 100a is restarted at a time T18 before the instruction information CINF1 is accumulated in the storage device 240a as the update information UINFa. It is to be noted that the time T18 is a time after the time T10 at which the active period of the system 10a and the standby period of the system 10b are started. Processes substantially the same as those described in FIG. 7 are denoted by the same reference signs, and detailed description thereof will be omitted.

The operations illustrated in FIG. 11 are substantially the same as the operations illustrated in FIG. 7 except that (i) the updating flag PFLG is set, (ii) the management server 100a is restarted, and (iii) the error information EINF is transmitted to the terminal device 500 after the management server 100a is restarted.

The updating flag PFLG is, for example, a flag indicating whether or not the update processing for updating the database DB on the basis of the instruction information CINF is being executed. The updating flag PFLG set to "1" indicates that the update processing is being executed, and the updating flag PFLG set to "0" indicates that the update processing is not being executed. In FIG. 11, it is assumed that the initial value of the updating flag PFLG is "0". In FIG. 11, it is assumed that the state of the updating flag PFLG does not change even when the management server 100a is restarted.

First, the terminal device 500 transmits the instruction information CINF1 to the management server 100a (S500). The management server 100a receives the instruction information CINF1 from the terminal device 500 (S100a). Then, since the management server 100a has received the instruction information CINF1 from the terminal device 500, the management server 100a sets the updating flag PFLG to "1" (S101a).

The management server 100a transmits the instruction information CINF1 to the database server 200a (S102a). The database server 200a receives the instruction information CINF1 from the management server 100a, and reflects, in the database DBa (S200a and S202a), the content of the instruction information CINF1. Then, the database server 200a transmits to the management server 100a response information ACK1 indicating that the content of the instruction information CINF1 has been reflected in the database DBa (S204a).

The management server 100a receives the response information ACK1 from the database server 200a and transmits the response information ACK1 to the terminal device 500 (S104a and S106a). The terminal device 500 receives the response information ACK1 from the management server 100a (S502).

Then, the management server 100a restarts at the time T18 before the management server 100a transmits the instruction information CINF1 to the information accumulation device 300a. The restart of the management server 100a corresponds to the restart of the system 10a.

Since the updating flag PFLG is set to "1" after the restart, the management server 100a determines that no instruction information CINF1 has been accumulated in the storage device 240a. Therefore, the management server 100a transmits error information EINF indicating that the instruction information CINF1 is not accumulated in the storage device 240a to the terminal device 500 that has received the operation for generating the instruction information CINF1 (S108a).

The terminal device 500 receives the error information EINF from the management server 100a (S503). For example, the terminal device 500 notifies the administrator Cer that no instruction information CINF1 has been accumulated in the storage device 240a. Specifically, the terminal device 500 displays, for example, information indicating that no instruction information CINF1 has been accumulated in the storage device 240a on the display of the terminal device 500. As a result, the administrator Cer can understand that no instruction information CINF1 has been accumulated in the storage device 240a. Therefore, for example, the administrator Cer executes an accumulation instruction operation for accumulating the instruction information CINF1 in the storage device 240a on the terminal device 500. The accumulation instruction operation of the instruction information CINF1 is substantially the same as the operation for generating the instruction information CINF1, for example, except that the accumulation instruction operation does not cause the content of the instruction information CINF1 to be reflected in the database DBa.

For example, the terminal device 500 that has received the accumulation instruction operation of the instruction information CINF1 generates the instruction information rCINF1 for accumulating the instruction information CINF1 in the storage device 240a, and transmits the generated instruction information rCINF1 to the management server 100a (S504). The instruction information rCINF1 may include, for example, in addition to the instruction information CINF1, information indicating that the instruction information CINF1 is to be accumulated in the storage device 340a but without being reflected in the database Dba.

The management server 100a receives the instruction information rCINF1 from the terminal device 500 (S109a). Then, the management server 100a transmits the instruction information CINF1 to the information accumulation device 300a on the basis of the instruction information rCINF1 received from the terminal device 500 (S110a). The information accumulation device 300a receives the instruction information CINF1 from the management server 100a, and accumulates the instruction information CINF1 in the storage device 340a as the update information UINFa (S300a and S302a). Then, the information accumulation device 300a transmits accumulation completion information FINF indicating that the instruction information CINF1 has been accumulated in the storage device 340a to the management server 100a (S304a).

After the instruction information CINF1 is accumulated in the storage device 340a as the update information UINFa, similarly to the operations illustrated in FIG. 7, the reflection processing of the update information UINFa is executed (S320a, S322a, S120b, S122b, and the like). In a case in which the instruction information CINF1 is accumulated in the storage device 340a as the update information UINFa, the information accumulation device 300a transmits the accumulation completion information FINF to the management server 100a regardless of whether the management server 100a is restarted.

The management server 100a receives the accumulation completion information FINF from the information accumulation device 300a (S112a). As a result, the management server 100a can recognize that the instruction information CINF1 is accumulated in the storage device 340a. Since the instruction information CINF1 is accumulated in the storage device 340a, the management server 100a sets the updating flag PFLG to "0" (S114a).

As described above, in the present modification, even when the management server 100a is restarted, the instruction information CINF1 can be accumulated in the storage device 340a as the update information UINFa by the operation on the terminal device 500 by the administrator Cer. As a result, in the present modification, even when the management server 100a is restarted, the databases DBa and DBb can be synchronized with each other.

It is to be noted that the operations of the redundant system 1 using the management server 100 according to the first modification is not limited to the example illustrated in FIG. 11. For example, when notified that the instruction information CINF1 is not accumulated in the storage device 240a, the administrator Cer may again execute the operation for generating the instruction information CINF1 instead of executing the accumulation instruction operation. In this case, the processing reflecting the content of the instruction information CINF1 in the database DBa is executed again, but the instruction information CINF1 can be accumulated in the storage device 340a as the update information UINFa.

For example, as another mode of the first modification, the management server 100a may temporarily store the instruction information CINF1 in a predetermined storage area in which information is held even when being restarted. In this case, the management server 100a stores the instruction information CINF1 in the predetermined storage area instead of setting the updating flag PFLG to "1". Then, after restarting, the management server 100a transmits the instruction information CINF1 held in the predetermined storage area to the information accumulation device 300a instead of transmitting the error information EINF to the terminal device 500. Instead of setting the updating flag PFLG to "0", the management server 100a deletes the instruction information CINF1 from the predetermined storage area. In the present embodiment (the other mode of the first modification), since the administrator Cer is not required to execute the accumulation instruction operation or the like, usability of the redundant system 1 is improved. Furthermore, in the present embodiment, after the management server 100a is restarted, the instruction information CINF1 can be accumulated in the storage device 340a as the update information UINFa without depending on an operation of the administrator Cer.

For example, as another mode of the first modification, in a case in which the instruction information CINF1 is accumulated in the storage device 340a as the update information UINFa, the information accumulation device 300a may transmit the accumulation completion information FINF to the management server 100a and the management server 100b of the system 10b. In this case, the management server 100b of the system 10b may transmit the read request RREQ to the information accumulation device 300a of the system 10a upon receipt of the accumulation completion information FINF.

As described above, also in the present modification, substantially the same effects as those of the above-described embodiment can be obtained. Furthermore, in the present modification, in a case in which the system 10a is restarted before the instruction information CINF1 is accumulated in the storage device 340a as the update information UINFa, the active process executor 122a transmits the error information EINF to the terminal device 500 after the system 10a is restarted. As a result, in the present modification, when the system 10a is restarted, it is possible to reduce or prevent the system 10a from being operated without the instruction information CINF1 being accumulated in the storage device 340a as the update information UINFa. As a result, in the present modification, when the system 10a is restarted, it is possible to reduce or prevent the system 10a from being operated in a state in which the databases DBa and DBb are not synchronized with each other.

Second Modification

In the embodiment and the modification described above, whether or not the content of the update information UINF accumulated in the storage device 340 of the system 10 recovered from the error is normal is not particularly determined, but whether or not the content of the update information UINF is normal may be determined. It is to be noted that "normal or not" means "normal or not normal".

FIG. 12 is an explanatory diagram for explaining an example of operations of a redundant system 1 using a management server 100 according to a second modification. It is to be noted that FIG. 12 illustrates an example of the update information UINF used for the redundant system 1 using the management server 100 according to the second modification.

The update information UINFa shown in FIG. 12 is substantially the same as the update information UINF illustrated in FIG. 6, except that a recovery flag is added to the update information UINF shown in FIG. 6. However, in FIG. 12, in order to facilitate understanding of the description, it is assumed that a record R3 is stored in the update information UINFa in addition to the records R2 and R4 stored in the update information UINF illustrated in FIG. 6. The content of the record R3 of the update information UINFa indicates the content of instruction information CINF received by the active process executor 122 at 13:09:40 on Mar. 23, 2021 (the content of the record R3 after the update).

The recovery flag is an example of "first determination information" and "second determination information". In a case in which the update information UINFa corresponds to the "first update information", the recovery flag of the update information UINFa corresponds to the "first determination information". In a case in which the update information UINFa corresponds to the "second update information", the recovery flag of the update information UINFa corresponds to the "second determination information". For example, the recovery flag is stored in the update information UINF in association with the record R, and indicates whether or not the content of the corresponding record R is normal. Each circle mark of the recovery flag in FIG. 12 indicates that the content of the record R is normal, and each cross mark of the recovery flag indicates that the content of the record R is not normal.

For example, in a case in which the system 10a recovers from an error, the standby process executor 124a determines whether or not the content of the update information UINFa accumulated in the storage device 340a is normal for each record R. A method of determining whether or not the content of the update information UINFa is normal is not particularly limited. For example, the standby process executor 124a may determine that the content of the update information UINFa is normal based on the absence of an internal error.

Then, the standby process executor 124a stores a recovery flag indicating for each record R whether or not the content of the update information UINFa is normal in the storage device 340a in association with the update information UINFa. The active process executor 122b of the system 10b can recognize whether or not the content of the update information UINFa is normal for each record R by checking the recovery flag.

For example, in the update information UINFa illustrated in FIG. 12, the telephone number of the transfer destination is not stored in both of the records R3 and R4, but the recovery flag of the record R4 indicates that the content of the record R4 is normal. On the other hand, the recovery flag of the record R3 indicates that the content of the record R3 is not normal. As a result, the active process executor 122b can recognize that the contents of the records R2 and R4 are normal and the content of the record R3 is not normal among the update contents indicated by the update information UINFa.

The record R3, which is not normal among one or more records R (R2, R4 and R3) indicated by the update information UINFa, is not selected as the unreflected record R regardless of the update content indicated by the update information UINFb of the active system. For example, in a case in which a recovery flag indicating whether or not the update information UINFa is normal for each record R is associated with the update information UINFa, the active process executor 122b refers to the recovery flag. Then, the active process executor 122b does not reflect in the database DBb the content of a record R that is specified as not being normal on the basis of the recovery flag, from among the one or more records R indicated by the update information UINFa. As a result, in the second modification, it is possible to reduce or prevent the content of the record R that is not normal from being reflected in the database DBb.

As described above, also in the present modification, the same effects as those of the above-described embodiment and modification can be obtained. Furthermore, in the present modification, it is possible to reduce or prevent reflection of the content of the record R specified as not being normal on the basis of the recovery flag among the one or more records R indicated by the update information UINF of the standby system, in the database DB of the active system.

Third Modification

In the embodiment and the modifications described above, the case in which the determination as to whether to execute the recovery processing is performed in units of the record R of the database DB has been described, but the present invention is not limited to such an aspect. For example, as illustrated in FIG. 13, the determination as to whether to execute the recovery processing may be executed in units of registration items of the record R.

FIG. 13 is an explanatory diagram for explaining determination processing in a redundant system 1 using a management server 100 according to a third modification. In FIG. 13, as in FIG. 10 described above, it is assumed that an error has occurred in the system 10a before the standby process executor 124b acquires the update information UINFa accumulated in the storage device 340a. Furthermore, in FIG. 13, it is assumed that only the key information specifying the record R to be updated, the registration information to be updated, and the reception date and time among the plurality of pieces of registration information stored in the record R are included in the instruction information CINF. However, the instruction information CINF may include all of a plurality of pieces of registration information stored in the record R, similarly to the example illustrated in FIG. 10.

Also in FIG. 13, in order to facilitate understanding of the description, determination processing and the like will be described on the basis of the operation of the redundant system 1 illustrated in FIGS. 8 and 9 described above.

The update information UINFa of the standby system indicates the update information UINFa accumulated in the storage device 340a at the time when the error occurs in the system 10a (time T30 in FIG. 8). For example, instruction information CINF indicating update contents with respect to the transfer setting of the record R2 of the database dBa and instruction information CINF indicating update contents with respect to the transfer setting and the transfer destination of the record R4 are accumulated in the storage device 340a as update information UINFa. In the example illustrated in FIG. 13, the transfer setting of the record R2 and the transfer setting and transfer destination of the record R4 correspond to the update item (updated registration item) indicated by the update information UINFa.

The update information UINFb of the active system indicates the update information UINFb accumulated in the storage device 340b in a period from the time (for example, time T32 in FIG. 8) at which the active period is started in the system 10b to the time (for example, time T50 in FIG. 9) at which the system 10a is recovered. For example, instruction information CINF indicating update contents for each transfer setting of records R5, R6, and R4 of the database DBb is accumulated in the storage device 340b as the update information UINFb. In the example illustrated in FIG. 13, the transfer setting of the record R5, the transfer setting of the record R6, and the transfer setting of the record R4 correspond to the update item indicated by the update information UINFb.

A black star in FIG. 13 indicates an update item (transfer setting of the record R2 and transfer setting of the record R4) different from the update item indicated by the update information UINFb among the update items indicated by the update information UINFa. Furthermore, each white star in FIG. 10 indicates an update item (transfer setting of the record R4) that is the same as an update item indicated by the update information UINFb among the update items indicated by the update information UINFa.

For example, the active process executor 122b of the management server 100b compares the update information UINFa accumulated in the storage device 340a with the update information UINFb accumulated in the storage device 340b upon receipt of the recovery notification RINF.

Then, the active process executor 122b determines to execute the recovery processing in a case in which an unreflected item different from one or more update items indicated by the update information UINFb is included in one or more update items being one or more updated registration items indicated by the update information UINFa. In the example illustrated in FIG. 13, among the one or more update items indicated by the update information UINFa, the transfer setting of the record R2 and the transfer destination of the record R4 are unreflected items different from the one or more update items indicated by the update information UINFb. Accordingly, in the example illustrated in FIG. 13, the active process executor 122b determines to execute the recovery processing.

In addition, in response to determination to execute the recovery processing, the active process executor 122b reflects the content of the unreflected item indicated by the update information UINFa in the database DBb. For example, the active process executor 122b transmits update information UINFdif indicating the content of the unreflected item among the update items indicated by the update information UINFa to the database server 200b. In the example illustrated in FIG. 13, the update information UINFdif indicating that: the transfer setting of the record R2 is enabled (setting to transfer the telephone call addressed to the user corresponding to the record R2); and the telephone number of the transfer destination of the record R4 is deleted, is transmitted to the database server 200b. As a result, the content of the unreflected item that has not been reflected in the database DBb due to the occurrence of error or the like in the system 10a (the content of the unreflected item indicated by the update information UINFdif) is reflected in the database DBb.

It is to be noted that, in a case in which the one or more update items indicated by the update information UINFa include no unreflected item different from the one or more update items indicated by the update information UINFb, the active process executor 122b determines not to execute the recovery processing.

As described above, also in the present modification, the same effects as those of the above-described embodiment and modification can be obtained. Furthermore, in the present modification, the determination as to whether to execute the recovery processing is performed in units of registration items of the record R. Therefore, in the present modification, for example, when the system 10a is recovered, the update content that, due to an error or the like in the active system 10a, has not been reflected in the database DBb of the standby system can be reflected in the database DBb for each registration item.

Fourth Modification

In the embodiment and the modifications described above, the case in which the update information UINF has been accumulated in the storage device 340 of the information accumulation device 300 is described, but the present invention is not limited thereto. For example, the information accumulation device 300 may be omitted from the system 10, and the update information UINF may be accumulated in the storage device 340 of the management server 100. In this case, the processor 120 of the management server 100 also functions as the controller 322 illustrated in FIG. 4.

Alternatively, the database server 200 and the information accumulation device 300 may be omitted from the system 10, and the database DB and the update information UINF may be accumulated in the storage device 340 of the management server 100. In this case, the processor 120 of the management server 100 also functions as the controller 222 illustrated in FIG. 3 and the controller 322 illustrated in FIG. 4.

As described above, also in the present modification, the same effects as those of the above-described embodiment and modification can be obtained. Furthermore, in the present modification, since the information accumulation device 300 and the like are omitted from the system 10, the configuration of the system 10 can be simplified.

Fifth Modification

In the embodiment and the modifications described above, the case in which the standby process executor 124b transmits the deletion instruction information DINS instructing deletion of the update information UINFa accumulated in the storage device 340a to the system 10a is described, but the present invention is not limited thereto. For example, in a case in which the storage content of the database DBb is updated on the basis of the update information UINFa, the standby process executor 124b may transmit information indicating that the content of the update information UINFa has been reflected in the database DBb to the information accumulation device 300a of the system 10a. In this case, the information accumulation device 300a may delete the update information UINFa from the storage device 340a, or may store, in the storage device 340a in association with the update information UINFa, a flag indicating that the content of the update information UINFa has been reflected in the database DBb. As described above, also in the present modification, the same effects as those of the above-described embodiment and modification can be obtained.

Sixth Modification

In the embodiment and the modifications described above, the case in which the active process executor 122b stops receiving the instruction information CINF until the recovery processing is completed when it is determined to execute the recovery processing is described, but the present invention is not limited thereto. For example, in a case in which the active process executor 122b stops receiving the instruction information CINF until the determination as to whether to execute the recovery processing is completed, the receiving of the instruction information CINF that has been stopped may be canceled before executing the recovery processing. In this case, the active process executor 122b may hold the instruction information CINF received during the execution of the recovery processing in a storage unit such as a buffer, and update the storage content of the database DBb on the basis of the instruction information CINF held in the storage unit after the completion of the recovery processing. It is to be noted that, during the execution of the recovery processing, the active process executor 122b may transmit to the information accumulation device 300b the instruction information CINF received during the execution of the recovery processing, or may transmit the instruction information CINF to the information accumulation device 300b after the execution of the recovery processing. As described above, also in the present modification, the same effects as those of the above-described embodiment and modification can be obtained.

Seventh Modification

In the embodiment and the modifications described above, the case in which the system 10 includes a call processing server is described, but the present invention is not limited thereto. For example, in a case in which a service of an online game performed via a network such as the Internet is provided to the user, the system 10 may include a game server that executes control of the online game or the like instead of the call processing server. In this case, for example, the database DB used for the online game is stored in the storage device 240 of the database server 200. As described above, also in the present modification, the same effects as those of the above-described embodiment and modification can be obtained.

3. Other Matters (1) In the above-described embodiments, the storage device (for example, the storage devices 140, 240, and 340) is a recording medium that can be read by the processor (for example, processors 120, 220 and 320), and examples thereof include the ROM and the RAM. However, the storage device is a flexible disk, a magneto-optical disk (for example, a compact disc, a digital versatile disc, or a Blu-ray (registered trademark) disc), a smart card, a flash memory device (for example, a card, a stick, or a key drive), a CD-ROM (Compact Disc-ROM), a register, a removable disk, a hard disk, a floppy (registered trademark) disk, a magnetic strip, a database, a server, or some other appropriate storage medium. The program may be transmitted from a network via a telecommunication line. Furthermore, the program may be transmitted from a communication network via a telecommunication line.

(2) The above-described embodiments may be applied to at least one of a system using Long Term Evolution (LTE), LTE-Advanced (LTE-A), SUPER 3G, IMT-Advanced, 4G (4th generation mobile communication system), 5G (5th generation mobile communication system), Future Radio Access (FRA), New Radio (NR), W-CDMA (registered trademark), GSM (registered trademark), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), other appropriate systems, and a next-generation system extended on the basis of these. Also, a plurality of systems may be applied in combination (for example, a combination of at least one of LTE and LTE-A and 5G, or the like).

(3) In the embodiments described above, the described information, signals, and the like may be represented using any of a variety of different techniques. For example, data, instructions, commands, information, signals, bits, symbols, chips, and the like that may be mentioned throughout the above description may be represented by voltages, currents, electromagnetic waves, magnetic fields or particles, optical fields or photons, or any desired combination thereof.

(4) In the embodiments described above, the input and output information and the like may be stored in a specific location (for example, memory) or may be managed using a management table. The input and output information and the like can be overwritten, updated, or additionally written. The output information and the like may be deleted. The input information and the like may be transmitted to another device.

(5) In the embodiments described above, the determination may be made by a value represented by one bit (0 or 1), may be made by a true/false value (Boolean: true or false), or may be made by comparison of numerical values (for example, comparison with a predetermined value).

(6) The order of the processing procedure, sequence, flowchart, and the like exemplified the embodiments described above may be changed as long as there is no contradiction. For example, for the methods described in the present disclosure, elements of various steps are presented using an example order and are not limited to the particular order presented.

(7) Each function illustrated in a drawing, such as in FIG. 1, is implemented by freely combining at least one of hardware or software. A method for realizing each functional block is not particularly limited. That is, each functional block may be implemented by using one physically or logically coupled device, or may be implemented by directly or indirectly (for example, by using wired, wireless, or the like) connecting two or more physically or logically separated devices and using a plurality of these devices. The functional block may be implemented by combining software with the one device or the plurality of devices.

Furthermore, the communication devices 160, 260, and 360 are hardware (transceiver devices) for performing communication between computers via at least one of a wired network and a wireless network, and are also referred to as, for example, a network device, a network controller, a network card, a communication module, or the like. The communication devices 160, 260, and 360 may include, for example, a high frequency switch, a duplexer, a filter, a frequency synthesizer, and the like in order to realize at least one of frequency division duplex (FDD) and time division duplex (TDD).

(8) The program exemplified in the embodiments described above is to be interpreted broadly to mean an instruction, an instruction set, a code, a code segment, a program code, a program, a subprogram, a software module, an application, a software application, a software package, a routine, a subroutine, an object, an executable file, an execution thread, a procedure, a function, or the like, regardless of whether the software is referred to as software, firmware, middleware, microcode, or a hardware description language, or is referred to by another name.

Software, instructions, information, and the like may be transmitted and received via a transmission medium. For example, in a case in which software is transmitted from a website, server, or other remote source using at least one of a wired technology (a coaxial cable, an optical fiber cable, a twisted pair, a digital subscriber line (DSL), or the like) and a wireless technology (infrared rays, microwaves, or the like), at least one of these wired and wireless technologies is included within the definition of the transmission medium.

(9) In each of the foregoing forms, the terms "system" and "network" are used interchangeably.

(10) The information, the parameter, and the like described in the present disclosure may be represented using an absolute value, may be represented using a relative value from a predetermined value, or may be represented using another corresponding information. For example, a radio resource may be indicated by an index. The names used for the parameters described above are not limiting in any respect. Furthermore, mathematical expressions and the like using these parameters may be different from those explicitly disclosed in the present disclosure. Since various channels (for example, PUCCH, PDCCH, and the like) and information elements can be identified by any suitable name, various names assigned to these various channels and information elements are not in any way limiting.

(11) In the embodiments described above, a case may be included in which the terminal device 500 and the external line telephone terminal 600 are mobile stations (MS). The mobile station may also be referred to by those skilled in the art as a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or other appropriate terms. Furthermore, in the present disclosure, terms such as "mobile station", "user terminal", "user equipment (UE)", and "terminal" can be used interchangeably.

(12) In the embodiments described above, the terms "connected", "coupled", and all variations thereof, mean every direct or indirect connection or coupling between two or more elements, and may include the presence of one or more intermediate elements between two elements that are "connected" or "coupled" to each other. The coupling or connection between the elements may be physical, logical, or a combination thereof. For example, "connection" may be replaced as "access". When used in the present disclosure, two elements can be considered to be "connected" or "coupled" to one another using at least one of one or more wires, cables, or printed electrical connections, and as some non-limiting and non-exhaustive examples, using electromagnetic energy having wavelengths in the radio frequency region, the microwave region, and light (both visible and invisible) region, or the like.

(13) In the embodiments described above, the description "on the basis of" does not mean "on the basis only of" unless explicitly stated otherwise. In other words, the description "on the basis of" means both "on the basis only of" and "on the basis at least of".

(14) The term "determining" or a "decision" used in the present disclosure may encompass a wide variety of actions. The term "determining" or a "decision" may include, for example, a fact of deeming that "determining" or making a "decision" has been performed on judging, calculating, computing, processing, deriving, investigating, searching (looking up, search, inquiry) (for example, searching a table, a database, or another data structure), and ascertaining, or the like. Furthermore, "determining" or "decision" may include a fact of deeming that "determining" or "decision" has been performed on receiving (for example, receiving information), transmitting (for example, transmitting information), input, output, and accessing (for example, accessing data in a memory), or the like. In addition, "determining" or "decision" may include a fact of deeming that "determining" or "decision" has been performed on resolving, selecting, choosing, establishing, comparing. That is, "determining" or "decision" may include a fact of deeming that "determining" or "decision" has been performed on some operation. Furthermore, "determining (decision)" may be replaced by "assuming", "expecting", "considering", or the like.

(15) In the embodiments described above, in a case in which terms "include", "including" and variations thereof are used, these terms are intended to be inclusive in a manner similar to the term "comprising." Furthermore, it is intended that the term "or" used in the present disclosure not be the exclusive OR.

(16) In the present disclosure, for example, in a case in which articles such as "a", "an", and "the" in English are added by translation, the present disclosure may include a case in which a noun following these articles is a plural form.

(17) In the present disclosure, the term "A and B are different" may mean "A and B are different from each other". It is to be noted that the term may also mean that "A and B are each different from C". Terms such as "separated", "coupled" or the like may also be interpreted in the same manner as "different".

(18) Each aspect and embodiment described in the present disclosure may be used alone, or may be used in combination, or may be switched with execution. Furthermore, notification of predetermined information (for example, notification of "being X") is not limited to being performed explicitly, and may be performed implicitly (for example, the predetermined information is not notified).

Although the present disclosure has been described in detail above, it is apparent to those skilled in the art that the present disclosure is not limited to the embodiments described in the present disclosure. The present disclosure can be implemented with modifications and variations without departing from the spirit and scope of the present disclosure as claimed in the claims. Therefore, the description of the present disclosure is for the purpose of illustration and does not have any restrictive meaning for the present disclosure.

DESCRIPTION OF REFERENCES SIGNS

1 Redundant system
10 System
100 Management server
120 Processor
122 Active process executor
124 Standby process executor
140 Storage device
160 Communication device
200 Database server
220 Processor
222 Controller
240 Storage device
260 Communication device
300 Information accumulation device 320 Processor
322 Controller
340 Storage device
360 Communication device
500 Terminal device
600 External line telephone terminal
602 Fixed telephone terminal
CINF Instruction information
DB Database
UINF Update information

The invention claimed is:

1. An information processing apparatus included in a first system of a redundant system in which one of the first system and a second system operates as an active system whereas another operates as a standby system, the information processing apparatus comprising:
an active process executor configured to, in response to a reception of instruction information for updating storage content of a first database included in the first system, update the storage content of the first database on a basis of the instruction information and accumulate the instruction information in a first memory included in the first system as first update information during a first period in which the first system operates as the active system; and
a standby process executor configured to, in a case in which second update information used for an update of storage content of a second database included in the second system has been accumulated in a second memory included in the second system, acquire the second update information from the second memory and update storage content of the first database on a basis of the second update information during a second period in which the first system operates as the standby system,
wherein, in a case in which the second system is operating as the active system, due to an event of an error in the second system, the first period starts in the first system before the standby process executor acquires the second update information accumulated in the second memory, the active process executor is configured to determine, upon recovery of the second system, whether to execute recovery processing reflecting content of the second update information in the first database on a basis of the first update information and the second update information.

2. The information processing apparatus according to claim 1, wherein, in response to a detection of the recovery of the second system, the active process executor is configured to stop receiving the instruction information until a determination as to whether to execute the recovery processing is completed.

3. The information processing apparatus according to claim 1, wherein:
each of the first database and the second database includes a plurality of records in each of which a plurality of pieces of registration information are stored, and
the active process executor is configured to, in a determination as to whether to execute the recovery processing, determine that the recovery processing is to be executed in a case in which one or more records indicated by the second update information includes an unreflected record differing from one or more records indicated by the first update information, and reflect, in the first database, content of the unreflected record indicated by the second update information.

4. The information processing apparatus according to claim 3, wherein:
the standby process executor is configured to, in a case in which the first system recovers from the error, determine for each record whether or not content of the first update information accumulated in the first memory is normal, and store in the first memory first determination information indicating for each record whether the content of the first update information is normal or is not normal, in association with the first update information, and
in a case in which second determination information that indicates for each record whether the second update information is normal or is not normal is associated with the second update information, the active process executor is configured not to reflect in the first database, from among one or more records indicated by the second update information, content of a record that is identified as being not normal on a basis of the second determination information.

5. The information processing apparatus according to claim 1, wherein:
each of the first database and the second database includes a plurality of records in each of which a plurality of pieces of registration information corresponding to a plurality of registration items is stored, and
the active process executor is configured to, in a case in which one or more update items being one or more registration items indicated by the second update information includes an unreflected item differing from one or more update items indicated by the first update information, determine that the recovery processing is to be executed in a determination as to whether to execute the recovery processing, and reflect in the first database, content of the unreflected item indicated by the second update information.

6. An information processing apparatus included in a first system of a redundant system in which one of the first system and a second system operates as an active system whereas another operates as a standby system, the information processing apparatus comprising:
an active process executor configured to, in response to a reception of instruction information for updating storage content of a first database included in the first system, update the storage content of the first database on a basis of the instruction information and accumulate the instruction information in a first memory included in the first system as first update information during a first period in which the first system operates as the active system; and
a standby process executor configured to, in a case in which second update information used for an update of storage content of a second database included in the second system has been accumulated in a second memory included in the second system, acquire the second update information from the second memory and update storage content of the first database on a basis of the second update information during a second period in which the first system operates as the standby system,
wherein, in a case in which the second system is operating as the active system, due to an event of an error in the second system, the first period starts in the first system before the standby process executor acquires the second update information accumulated in the second memory, the active process executor is configured to determine, upon recovery of the second system, whether to execute recovery processing reflecting content of the second update information in the first database on a basis of the first update information and the second update information, and wherein, in a case in which the storage content of the first database is updated on a basis of the second update information acquired from the second memory, the standby process executor is configured to transmit, to the second system, deletion instruction information instructing deletion of the second update information accumulated in the second memory.

7. The information processing apparatus according to claim 6, wherein, in response to a detection of the recovery of the second system, the active process executor is configured to stop receiving the instruction information until a determination as to whether to execute the recovery processing is completed.

8. The information processing apparatus according to claim 6, wherein:

each of the first database and the second database includes a plurality of records in each of which a plurality of pieces of registration information are stored, and the active process executor is configured to, in a determination as to whether to execute the recovery processing, determine that the recovery processing is to be executed in a case in which one or more records indicated by the second update information includes an unreflected record differing from one or more records indicated by the first update information, and reflect, in the first database, content of the unreflected record indicated by the second update information.

9. The information processing apparatus according to claim 6, wherein:

each of the first database and the second database includes a plurality of records in each of which a plurality of pieces of registration information corresponding to a plurality of registration items is stored, and the active process executor is configured to, in a case in which one or more update items being one or more registration items indicated by the second update information includes an unreflected item differing from one or more update items indicated by the first update information, determine that the recovery processing is to be executed in a determination as to whether to execute the recovery processing, and reflect in the first database, content of the unreflected item indicated by the second update information.

10. An information processing apparatus included in a first system of a redundant system in which one of the first system and a second system operates as an active system whereas another operates as a standby system, the information processing apparatus comprising:

an active process executor configured to, in response to a reception of instruction information for updating storage content of a first database included in the first system, update the storage content of the first database on a basis of the instruction information and accumulate the instruction information in a first memory included in the first system as first update information during a first period in which the first system operates as the active system; and a standby process executor configured to, in a case in which second update information used for an update of storage content of a second database included in the second system has been accumulated in a second memory included in the second system, acquire the second update information from the second memory and update storage content of the first database on a basis of the second update information during a second period in which the first system operates as the standby system, wherein, in a case in which the second system is operating as the active system, due to an event of an error in the second system, the first period starts in the first system before the standby process executor acquires the second update information accumulated in the second memory, the active process executor is configured to determine, upon recovery of the second system, whether to execute recovery processing reflecting content of the second update information in the first database on a basis of the first update information and the second update information, wherein each of the first database and the second database includes a plurality of records in each of which a plurality of pieces of registration information are stored the standby process executor is configured to, in a case in which the first system recovers from the error, determine for each record whether or not content of the first update information accumulated in the first memory is normal, and store in the first memory first determination information indicating for each record whether the content of the first update information is normal or is not normal, in association with the first update information, and in a case in which second determination information that indicates for each record whether the second update information is normal or is not normal is associated with the second update information, the active process executor is configured not to reflect in the first database, from among one or more records indicated by the second update information, content of a record that is identified as being not normal on a basis of the second determination information.

* * * * *